(12) United States Patent
Epstein

(10) Patent No.: US 9,047,379 B2
(45) Date of Patent: *Jun. 2, 2015

(54) METHODS AND APPARATUSES FOR SEARCHING CONTENT

(71) Applicant: ZALAG CORPORATION, Sammamish, WA (US)

(72) Inventor: Samuel S. Epstein, Sammamish, WA (US)

(73) Assignee: Zalag Corporation, Sammamish, WA (US)

( * ) Notice: Subject to any disclaimer, the term of this patent is extended or adjusted under 35 U.S.C. 154(b) by 192 days.

This patent is subject to a terminal disclaimer.

(21) Appl. No.: 13/779,350

(22) Filed: Feb. 27, 2013

(65) Prior Publication Data

US 2013/0173578 A1 Jul. 4, 2013

Related U.S. Application Data

(63) Continuation-in-part of application No. 13/371,254, filed on Feb. 10, 2012, now abandoned, which is a continuation of application No. 12/421,969, filed on Apr. 10, 2009, now Pat. No. 8,140,511, which is a (Continued)

(51) Int. Cl.
| | |
|---|---|
| *G06F 7/00* | (2006.01) |
| *G06F 17/30* | (2006.01) |
| *G06Q 30/02* | (2012.01) |
| *G06Q 30/00* | (2012.01) |

(52) U.S. Cl.
CPC ...... *G06F 17/30864* (2013.01); *G06Q 30/0256* (2013.01); *G06Q 30/00* (2013.01)

(58) Field of Classification Search
None
See application file for complete search history.

(56) References Cited

U.S. PATENT DOCUMENTS

| | | | |
|---|---|---|---|
| 6,285,999 B1 | 9/2001 | Page | |
| 6,618,727 B1 | 9/2003 | Wheeler et al. | |
| 6,687,404 B1 * | 2/2004 | Hull et al. | 382/226 |

(Continued)

FOREIGN PATENT DOCUMENTS

EP 1462952 A1 9/2004

OTHER PUBLICATIONS

International Search Report and Written Opinion for PCT/US2007/071026 mailed Aug. 8, 2008.

(Continued)

*Primary Examiner* — Azam Cheema
(74) *Attorney, Agent, or Firm* — Schwabe Williamson & Wyatt, PC

(57) ABSTRACT

Embodiments of methods and apparatuses for searching contents, including structured search for atomic search expressions, including proximately associated atomic search expressions, are described herein. Embodiments may use tree structures (or more generally, graph structures), layout structures, and/or other information to capture within search results relevant content, include sub-document constituents, to reduce the incidence of false positives within search results, and/or to improve the accuracy of rankings within search results. Embodiments may use distance and/or scoring functions to generate scores for the structures to indicate relevance, including usage of local geometry, and linear iteration over portions of the content at a level to capture potential of a portion to influence other portions of the level, and influence received by a portion from the other portions of the level. Other embodiments may be described and claimed.

30 Claims, 5 Drawing Sheets

Related U.S. Application Data continuation-in-part of application No. 11/761,948, filed on Jun. 12, 2007, now Pat. No. 7,987,169.

(60) Provisional application No. 60/813,246, filed on Jun. 12, 2006.

(56) References Cited

U.S. PATENT DOCUMENTS

| | | | |
|---|---|---|---|
| 6,711,585 B1 * | 3/2004 | Copperman et al. | 1/1 |
| 7,493,603 B2 | 2/2009 | Fuh et al. | |
| 7,496,560 B2 | 2/2009 | Manber et al. | |
| 7,664,727 B2 | 2/2010 | Van Doan et al. | |
| 7,814,085 B1 * | 10/2010 | Pfleger et al. | 707/708 |
| 7,987,169 B2 * | 7/2011 | Epstein | 707/706 |
| 8,015,129 B2 | 9/2011 | Thiesson et al. | |
| 8,140,511 B2 * | 3/2012 | Epstein | 707/706 |
| 8,145,617 B1 | 3/2012 | Verstak et al. | |
| 2003/0177115 A1 * | 9/2003 | Stern et al. | 707/4 |
| 2004/0133469 A1 | 7/2004 | Chang | |
| 2004/0193573 A1 | 9/2004 | Meyer | |
| 2004/0210567 A1 | 10/2004 | Bourdoncle | |
| 2005/0216335 A1 | 9/2005 | Fikes et al. | |
| 2006/0031233 A1 | 2/2006 | Liu et al. | |
| 2006/0036966 A1 | 2/2006 | Yevdayev | |
| 2006/0069982 A1 | 3/2006 | Petriuc | |
| 2006/0074903 A1 * | 4/2006 | Meyerzon et al. | 707/5 |
| 2007/0239554 A1 | 10/2007 | Lin et al. | |

OTHER PUBLICATIONS

Supplementary Partial European Search Report for EP Application No. 07798456.5, dated May 12, 2011.
Office Action for U.S. Appl. No. 13/371,254, mailed Nov. 28, 2012.
Office Action for U.S. Appl. No. 11/761,948, mailed May 28, 2009.
Final Office Action for U.S. Appl. No. 11/761,948, mailed Dec. 18, 2009.
Advisory Action for U.S. Appl. No. 11/761,948, mailed Mar. 1, 2010.
Office Action for U.S. Appl. No. 11/761,948, mailed Aug. 18, 2010.
Final Office Action for U.S. Appl. No. 11/761,948, mailed Jan. 7, 2011.
Advisory Action for U.S. Appl. No. 11/761,948, mailed Mar. 7, 2011.
Office Action for U.S. Appl. No. 12/421,969, mailed Apr. 27, 2011.
Final Office Action for U.S. Appl. No. 12/421,969, mailed Aug. 30, 2011.
Notice of Allowability for U.S. Appl. No. 12/421,969, mailed Nov. 17, 2011.

* cited by examiner

METHODS AND APPARATUSES FOR SEARCHING CONTENT

RELATED APPLICATIONS

This application is a continuation-in-part application of U.S. patent application Ser. No. 13/371,254, filed Feb. 10, 2012, which is a continuation application of U.S. patent application Ser. No. 12/421,969, filed Apr. 10, 2009, now U.S. Pat. No. 8,140,511, issued Mar. 20, 2012, which is a continuation-in-part application of U.S. patent application Ser. No. 11/761,948, filed Jun. 12, 2007, entitled "METHODS AND APPARATUSES FOR SEARCHING CONTENT," now U.S. Pat. No. 7,987,169, issued Jul. 26, 2011, which is a non-provisional application of provisional application 60/813,246 filed Jun. 12, 2006. This application claims priority to the Ser. No. 13/371,254 non-provisional application, the Ser. No. 12/421,969 non-provisional application, the Ser. No. 11/761,948 non-provisional application, and in turn, the 60/813,246 provisional application. The specifications of the Ser. No. 13/371,254 non-provisional application, the Ser. No. 12/421,969 non-provisional application, the Ser. No. 11/761,948 non-provisional application and the 60/813,246 provisional application are hereby fully incorporated by reference, to the extent they are consistent and support the present specification.

TECHNICAL FIELD

Embodiments of the present invention relate to the field of data processing, in particular, to methods and apparatuses for searching electronic documents.

BACKGROUND

Notwithstanding the significant advances made in the past decades, electronic document technology continues to suffer from a number of disadvantages preventing users from fully realizing the benefits that may flow from advances in computing and related technology.

For example, a Web page that satisfies a given search expression typically includes constituents that do not satisfy the search expression. In many cases, a small proportion of the page's total content will be relevant to the search. If the user's goal is information that corresponds to the search expression, then delivering the entire Web page to the user entails a waste of download bandwidth and a waste of screen real estate. It also presents the user with the task of finding the relevant constituents within the Web page. Highlighting search terms on the page eases this task only slightly. The problem of presenting search results on mobile devices is especially acute.

Standard Web search engines return links to Web pages. Various search engines handle search requests that specify categories or instances of sub-document constituents. These may be called "sub-document" search engines. Some sub-document search engines are limited to returning text constituents. Other sub-document search engines return constituents that belong to non-text categories, but are limited to non-text categories that can be characterized by very simple markup properties. Some sub-document search engines use string-based algorithms to determine which constituents to extract. Other sub-document search engines use tree-based algorithms that examine very simple properties of markup trees. Yet other sub-document search engines support highly expressive languages for specifying constituents. None of these sub-document search engines effectively exploits the inter-relationships of sub-document constituents, as these inter-relationships are reflected in document tree structures (or other document graph structures) and document layout structures.

Various search engines handle search requests that specify proximity relationships. Some search engines are fundamentally limited to string-based proximity relationships. Other search engines recognize constituent boundaries in order to ignore these boundaries. Other search engines recognize when search terms occur within the same constituent. None of these search engines effectively exploits structural proximity relationships that are based on properties of the tree structures (or other graph structures) and layout structures of documents.

Co-occurrences of search terms within documents are evidence that the search terms are mutually relevant. Moreover, relevance is transitive. Current systems use learning algorithms that leverage these principles to enable responses to search requests where in some cases, the response doesn't include any of the words contained in the request. These systems require a learning process.

The very limited download bandwidth and screen real estate associated with mobile devices has motivated the creation of the WAP (Wireless Access Protocol) network. Because building a WAP site is labor intensive, the WAP network remains extremely small, in comparison to the World Wide Web, and has correspondingly less to offer users. For purposes of search, the World Wide Web is a vastly more powerful resource than the WAP network.

Limited download bandwidth and limited screen real estate has also motivated the creation of browsers that reformat HTML files for presentation on mobile devices. These mobile browsers reformat content so that horizontal scrolling is reduced. They may introduce page breaks into tall pages. They may remove or replace references to large files. They may replace fonts. They may offer distinctive user interfaces. Similar functionality is also offered by server transcoders that intercept user requests for HTML files. Such a server transcoder may be applied to reformat Web pages that satisfy search criteria. Current mobile browsers and server transcoders offer at most very rudimentary content extraction facilities, based on limited ranges of simple criteria.

Another limitation of current technology involves false hits for complex search expressions. Suppose that a given Web page contains a constituent $N_1$ that contains a single occurrence of the term haydn but doesn't contain the term boccherini. Suppose further that the page contains a constituent $N_2$ that contains a single occurrence of the term boccherini but doesn't contain the term haydn. And suppose that the page contains just this one occurrence of haydn and just this one occurrence of boccherini. Now suppose that a user searches the Web with the intention of finding information that pertains to both haydn and boccherini. While the Web page contains occurrences of both haydn and boccherini, the page may or may not satisfy the user's search request. Whether it does depends in part on the characteristics of $N_1$ and $N_2$, and on the relationship of these constituents within the Web page. Current technology is unable to use the correspondence of search expressions to sub-page constituents to reduce the incidence of false hits.

Similarly, current technology is unable to use the correspondence of search expressions to sub-page constituents to produce correct sub-page hits for search expressions with irreducible negation. Suppose that the search expression "haydn and not boccherini" is applied to the Web page described in the preceding paragraph. Constituent $N_1$ satisfies this expression, but the page as a whole does not. Given that the user's request can be satisfied with sub-page constituents, systems that are limited to returning entire pages will not provide optimal responses.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include but are not limited to content search methods and apparatuses, in particular, content search methods and apparatuses that examine content structures.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

The present invention permits the results of searches performed over sets of Web pages or other content to correspond more accurately to users' requests. In various embodiments, searches return relevant document constituents, rather than entire documents. In various embodiments, constituents from documents may be combined in a single display. The present invention thus enables the display of search results on mobile and other devices without wasting download bandwidth and screen real estate on irrelevant Web page constituents. The present invention also permits more accurate results for searches based on combinations of search terms, and provides mechanisms for increasing the accuracy of search results through analysis of search match distributions. Further, the present invention supports content requests that specify content categories, in addition to specifying search expressions to be matched. The present invention's methods and apparatuses can be applied in advance of content-request time, annotating content that can then be cached with its annotations for faster processing at content-request time.

Figure 1:
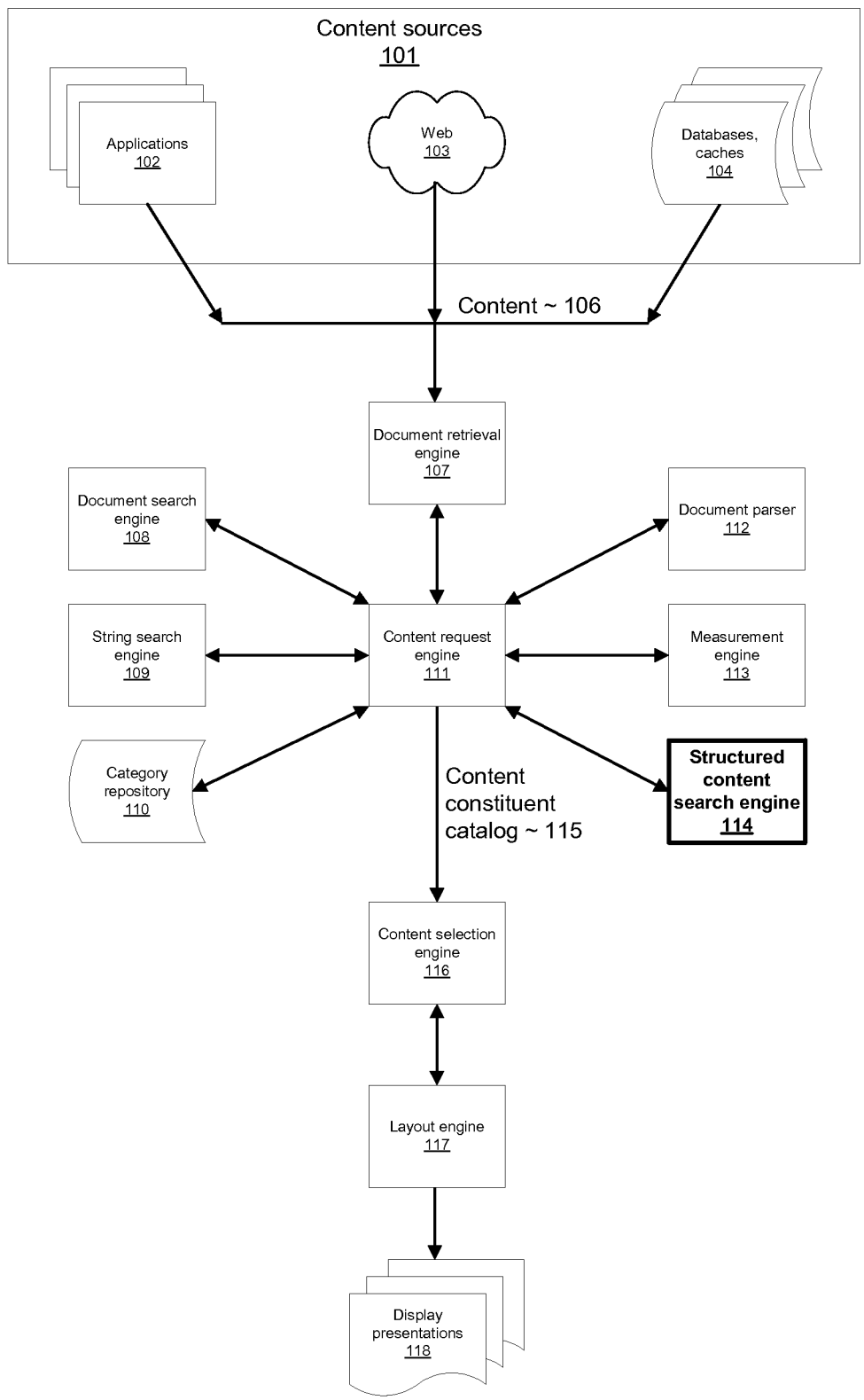
FIG. 1 illustrates an overview of the methods and apparatuses of the present invention, in accordance with various embodiments.

Referring now to FIG. 1, wherein a block diagram illustrating an overview of the content search methods and apparatuses of the present invention, in accordance with various embodiments, is shown. As illustrated, for the embodiments, content request engine 111, incorporated with the teachings of the present invention, controls the processing of user content requests. Content request engine 111 directs one or more document search engines 108 to identify content 106 from a variety of sources 101, including but not limited to applications 102, Web 103, and content databases and caches 104. Document search engines 108 represent a broad category of application that includes, but is not limited to, Web search engines, content management systems, and database management systems. With documents containing desired content identified, content request engine 111 directs one or more document retrieval engines 107 to retrieve documents. In some cases, document search and document retrieval functionality may be combined in a single engine. Content request engine 111 directs retrieved documents to one or more document parsers 112, which provide the tree or other graph structures associated with retrieved documents. Content request engine 111 then directs parsed documents to content search engine 114, incorporated with the teachings of the present invention. In alternate embodiments, web search engines etc. may return documents that have been pre-parsed or equivalently prepared. For these embodiments, content request engine 111 may direct the pre-parsed documents directly to content search engine 114. Content search engine 114 may call string search engine 109 and measurement engine 113 directly, or may access the functionality of these engines through the mediation of content request engine 111, as shown in FIG. 1. Content search engine 114 may access category repository 110 directly, or may access category repository 110 through the mediation of content request engine 111, as shown in FIG. 1. The functionality of one or more of the following may be combined in a single engine: document retrieval engine 107, document search engine 108, string search engine 109, document parser 112, measurement engine 113. Measurement engines 113 provide information related to the intended layout and rendering of retrieved documents and their constituents. In various embodiments of the present invention, the output of the content search engine 114 is provided as a content constituent catalog 115. In various embodiments of the present invention, the content constituent catalog is directed to a content selection engine 116, which works with a layout engine 117 to construct display presentations 118. Content search engine 114 may communicate with content selection engine 116 directly, or through the mediation of content request engine 111, as shown in FIG. 1. While for ease of understanding, the functions performed by content request engine 111 and content search engine 114 are illustrated as distinct components, in practice, their functions may be partitioned and assigned to different smaller modules and/or tasks. Alternatively, they may be combined in a single module. The various modules and/or tasks may be executed as a single thread, or as multiple threads where appropriate. In various embodiments, the execution of document retrieval engine 107, document search engine 108, string search engine 109, content request engine 111, document parser 112, measurement engine 113, content search engines 114, content selection engine 116, and layout engine 118, and the storage of category repository 110, may be on the same system, and in other embodiments, they may be on different systems, e.g. with 107, 109, 111, 112, 113, 114, 116, and 117 on one server, and document search engine 108 on a different server. For these latter embodiments, communication between content request engine 111 and content document search engine 108 may be in accordance with any one of a number of communication protocols, including but not limited to HTTP and/or HTTPS, with or without going through one or more communication modules/layers (where HTTP=Hypertext Transmission Protocol, and HTTPS=Hypertext Transmission Protocol Secured).

In various embodiments, category repository 110, content request engine 111, content search engine 114, content selection engine 116, and layout engine 117, together with document retrieval engine 107, string search engine 109, document parser 112, and measurement engine 113, may be implemented as part of a "larger" product offering. For example, in various embodiments, all nine components 107, 109, 110, 111, 112, 113, 114, 116, and 117 may be implemented as part of a Web search service. In still other embodiments, 107, 108, 109, 110, 111, 112, 113, and 114 may be part of a Web search service, while content selection engine 116 and layout engine 117 may be part of an enhanced Web browser or publishing tool. In still other embodiments, other implementation arrangements may also be possible.

I. Overview and General Observations

Markup files and other content sources are viewed as structured content, in tree, graph or other like forms. Important categories of content sources are intended to be laid out by specific classes of layout engines. For example, HTML files are generally intended to be laid out by browsers whose layout engines conform to W3C standards. For ease of understanding, the invention will be primarily described with markup files and other content sources structured as trees, and content search engine 114 shall also be referred to as structured content search engine 114, however the description should not be read as limiting on the invention. Embodiments of the present invention use tree structures (or more generally, graph structures), layout structures, and content category information to capture within search results relevant content that would otherwise be missed, to reduce the incidence of false positives within search results, and to improve the accuracy of rankings within search results. Embodiments of the present invention further use tree structures (or more generally, graph structures), layout structures, and content category information to extend search results to include sub-document constituents. Embodiments of the present invention also support the use of distribution properties as criteria for ranking search results. And embodiments of the present invention support search based on structural proximity.

In what follows, "structured content search," "structured search," and "structure search" will be used interchangeably to refer to embodiments of the present invention.

In what follows, an "atomic search term" is either a quoted string of characters, or a string of characters that doesn't contain a designated delimiter (such as space, period, and quotation mark). In what follows, atomic search terms and search expressions more generally will appear in italics. "Franz Joseph Haydn" and Haydn are examples of atomic search terms. Atomic search terms may include wildcards. A "search expression" may be formed from atomic search terms with various operators, such as the standard conjunction, disjunction, and negation operators. In what follows, AND denotes the standard conjunction operator, OR denotes the standard disjunction operator, and NOT denotes the standard negation operator. Using parentheses for grouping, (haydn AND NOT mozart) OR (boccherini AND pleyel) is an example of a search expression.

Figure 2:
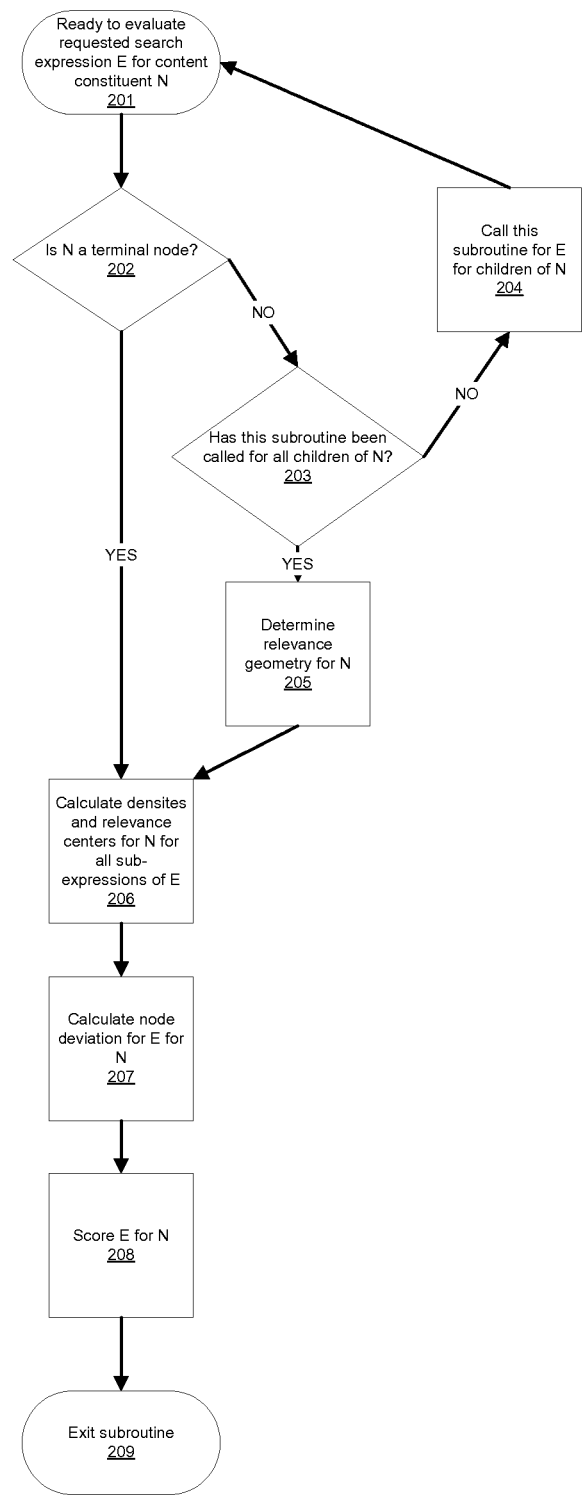
FIGS. 2-4 illustrate selected operations of the structured content search engine of FIG. 1, in accordance with various embodiments.
Figure 3:
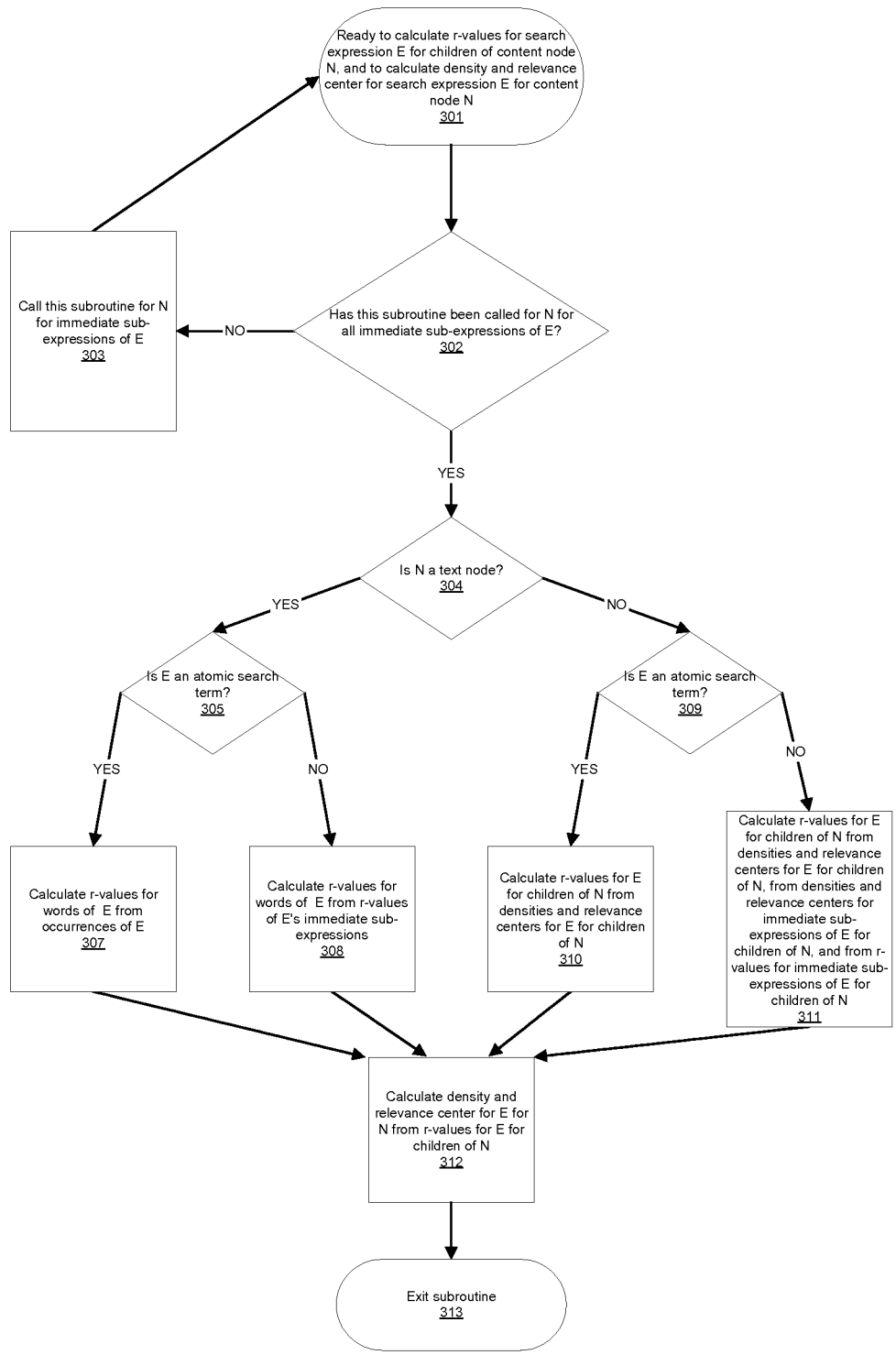

In the general case, embodiments of the present invention employ a recursive procedure that calls another recursive procedure, as illustrated in FIGS. 2-3. In various embodiments, the outer procedure walks the parse trees associated with markup or other content, from bottom to top. In various embodiments, these parse trees may be enhanced with information derived from layout structures. In various embodiments, the inner procedure walks the simple parse trees associated with search expressions, also from bottom to top. In various embodiments, the subroutine illustrated in FIG. 2 is part of the structured content request search engine 114 illustrated in FIG. 1. In various embodiments, the subroutine "calculate densities and r-centers for N for all sub-expressions of E" 206 shown in FIG. 2 corresponds to the subroutine illustrated in FIG. 3. In various embodiments, the subroutine "calculate node deviation for E for N" 207 corresponds to the subroutine illustrated in FIG. 4.

To support ranking for search results, embodiments of the present invention define matching as a function that takes a content constituent and a search expression and returns a real number between 0 and 1 inclusive, with 1 corresponding to the best possible match, and 0 corresponding to no match. Taking values between 0 and 1 is a matter of computational convenience. It involves no loss of modeling power. Content constituents may be aggregates of lower content constituents.

Other things being equal, even distributions make for better search matches. When an atomic search term appears within a string, it's of course possible that the string has no relevance to the term. Standard search algorithms proceed on the reasonable assumption that the string is relevant to the term. It's also reasonable to proceed on an assumption that relevance increases with density. Given a fixed size for a string, as the number of occurrences of an atomic search term within the string increases, so does the presumed relevance of the term to the string. Given a fixed number of occurrences of an atomic search terms, as the length of the string containing the occurrences increases, the presumed relevance of the term to the string decreases.

This reflects a slightly deeper principle. It's reasonable to proceed on an assumption that as distance from an occurrence of an atomic search term increases, relevance to the search term decreases. Relevance doesn't correspond to a function that takes maximum value on hits, and value zero everywhere else. Instead, it displays a sort of quasi-continuity.

Suppose that two strings $S_1$ and $S_2$ each contain 1000 words, and that these two strings each contain 9 occurrences of the atomic search term haydn. In $S_1$, the 9 occurrences of haydn are all contained in a substring $S_{1,1}$ that's begins at word position 807 and ends at word position 883. In $S_2$, the 9 occurrences of haydn are at word positions 99, 202, 301, 397, 499, 601, 706, 798, and 899. It's reasonable to proceed on an assumption that $S_{1,1}$ is highly relevant to haydn, and that $S_2$ as a whole is more relevant to haydn than is $S_1$ as a whole. The even distribution of haydn within $S_2$ guarantees that no part of $S_2$ is more than 105 words away from an occurrence of haydn, while the entire first half of $S_1$ is more than 300 words away from any occurrence of haydn. It's reasonable to proceed on an assumption that most of $S_1$ has little relevance to haydn. While the primary goal of search is the delivery of relevant content, it's an important secondary goal to avoid the delivery of irrelevant content. These goals are somewhat at odds in the case of $S_1$. $S_1$ is definitely a valid result for a search for haydn, but its presumed inclusion of irrelevant material lowers its ranking.

These observations generalize from strings to content constituents, and from atomic search terms to search expressions. Within a content constituent, relevance to a search expression decreases with distance from direct matches. Overall relevance to a search expression for a content constituent increases with match density. Overall relevance to a search expression for a content constituent increases as the match distribution becomes more even.

While the term "structural proximity" refers to the use of tree structures and layout structures, the relevant methods also apply to strings.

Various well-known algorithms support string-based proximity as a search criterion. However, prior algorithms do not adequately capture the principle that relevance decreases as distance increases. For example, if a user requests texts that contain an occurrence of haydn within 5 words of an occurrence of boccherini, the prior art response would exclude a text that's 100 words long that contains occurrences of haydn at word positions 5, 20, 41, 59, 79, and 93, and that contains occurrences of boccherini at word positions 12, 30, 51, and 72. However, it's very likely that this text is relevant to both haydn and boccherini. Further, it's very likely that this text relates haydn and boccherini. If a user seeks information that relates haydn and boccherini, a search that misses this text is inadequate. The text can be included in a response to a request for texts that contain an occurrence of haydn within 7 words of an occurrence of boccherini, but such a request will miss texts with similar distribution patterns where the occurrences of haydn and boccherini are a little farther apart. In addition to the problems associated with fixed proximity thresholds, prior algorithms don't take adequate account of density and distribution within strings, and don't take advantage of tree structures (or more generally, graph structures), layout structures, and content category information.

In what follows, "##" will indicate a structural proximity operator. haydn ## boccherini is an example of a search expression with the structural proximity operator.

Given that the structural proximity operator is available, it makes sense to also provide classical logical operators. Thus a content constituent matches haydn AND boccherini if and only if it matches both haydn and boccherini. Negation and disjunction may likewise be interpreted a strictly classical sense. Search expressions may be constructed recursively with structural proximity and other operators. For example, (haydn AND NOT pleyel) ## (mozart OR boccherini) requests constituents in which a sub-constituent (not necessarily a proper sub-constituent) that matches haydn but does not match pleyel is in structural proximity to a sub-constituent (not necessarily a proper sub-constituent) that matches at least one of mozart and boccherini. Structural proximity (##) is scalar-valued, while classical conjunction (NOT), disjunction (OR), and negation (NOT) are boolean-valued.

An analog of the negation operator for structural proximity may be introduced. This will be called the "structural proximity complement" operator and indicated as "~" in what follows. An analog of the disjunction operator for structural proximity may also be introduced. This will be called the "structural proximity disjunction" operator and indicated as %% in what follows. The structural proximity operator, ##, may be alternatively referred to as the "structural proximity conjunction" operator, to emphasize its distinctness from the structural proximity complement operator and the structural proximity disjunction operator.

According to various embodiments of the present invention, for instances of classical, boolean-valued operators (AND, OR, NOT) directly embedded under scalar-valued operators (##, %%, ~) in search expressions, a value of true is converted to a scalar value of 1, and a value of false is converted to a scalar value of 0. According to various embodiments, for instances of scalar-valued operators directly embedded under boolean-valued operators in search expressions, values greater than 0 are converted to true, and values of 0 are converted to false. Search requests may also include various scalar-valued (fuzzy) logical operators. For example, search requests may include operators which will be denoted here as &&, ||, and !. If the scores of $E_1$ and $E_2$ on a content constituent N are respectively $s_1$ and $s_2$, then the score on N of $E_1$ && $E_2$ is the minimum of $s_1$ and $s_2$, the score on N of $E_1 \| E_2$ is the maximum of $s_1$ and $s_2$, and the score on N of $!E_1$ is $(1-s_1)$. If a Boolean-valued expression E is embedded under a scalar-valued operator, then a value for E of true is converted to a scalar value of 1, and a value for E of false is converted to a scalar value of 0.

In generalizing from classic search to structural proximity search, and in generalizing from search on strings to search on trees and layout structures, the concept of search match shifts. Various embodiments of the present invention offer alternative revised concepts of search match. As it turns out, the revised concepts provide a foundation for improved results for search on strings. The classic concept of search focuses exclusively on the direct matches found within content constituents. But no word within a string can be a direct match for an expression such as haydn ## boccherini. And no paragraph within a constituent that comprises multiple paragraphs will be a perfect match for haydn (excepting the unlikely event that some paragraph consists entirely of occurrences of haydn). According to various embodiments of the present invention, all sub-constituents of a content constituent N figure in evaluations of search expressions on N. According to other embodiments of the present invention, in evaluations of search expressions on a content constituent N, direct search matches correspond in some cases to structures of sub-constituents of N.

II. Atomic Search within Strings

A. Assignment of Relevance Values to Words

Given an atomic search term E, and given a string S, embodiments of the present invention assign a "relevance value" ("r-value" or simply "value") to each word in S according to the following conditions: (i) if S contains no occurrences of E, then each word in the string (corresponding to a position in the string) is assigned an r-value of 0; (ii) if S contains at least one occurrence of E, then for any word W in S, the r-value assigned to W is $\Sigma_{1 \leq i \leq k}(1/(1+d_i)^x)$, where k is the number of occurrences of E in S, where x (the "distance attenuation exponent") is a positive real number, and where $d_i$ is the distance in words between W and the i-th occurrence of E, the distance between a pair of adjacent words taken as 1, and so on. The distance between a word W and an occurrence of an atomic search term E that comprises more than one word is the maximum of the distances between W and the words in E.

Embodiments of the present invention proceed to normalize r-values assigned to words so that these r-values lie between 0 and 1 inclusive—the r-value assigned to W according to paragraph 0038 above is divided by $\Sigma_{1 \leq i \leq n}(1/(1+d_i)^x)$, where n is the number of words in S, where x is the attenuation exponent, and where $d_i$ is the distance between W and the i-th word of S. Note that prior art includes methods for calculating or estimating these normalization factors with closed forms.

Various embodiments of the invention use various distance attenuation exponents. A distance attenuation exponent of 1 gives reasonable results. Alternative embodiments of the invention measure distances within strings in characters, rather than in words.

According to alternative embodiments of the invention, the distance between a word W and an occurrence of an atomic search term E that comprises more than one word is the minimum of the distances between W and the words in E. According to other alternative embodiments of the invention, the distance between a word W and an occurrence of an atomic search term E that comprises more than one word is the arithmetic mean of the distances between W and the words in E.

According to alternative embodiments of the invention, given an atomic search term E, and given a string S, a r-value is assigned to each word in S according to the following conditions: (i) if S contains no occurrences of E, then each word in the string is assigned a r-value of 0; (ii) if S contains at least one occurrence of E, then for any word W in S, the r-value assigned to W is the $1/(L^x)$, where L is the length in words of the shortest substring of S that contains both W and an occurrence of E, and where x is a positive real number.

According to alternative embodiments of the invention, distances computed in accordance with paragraph 0038, or lengths computed in accordance with paragraph 0042, are calculated in terms of characters, rather than in terms of words.

B. Density

Embodiments of the present invention capture the density of matches for atomic search expression E in string S as the arithmetic mean of the r-values assigned to the words in S.

Alternative embodiments of the present invention capture the density of matches for atomic search expression E in string S as the median, or as the geometric mean, of the r-values assigned to the words in S.

C. Distribution

Given D as the arithmetic mean of the r-values assigned to the words of string S for search expression E, embodiments of the present invention proceed to capture the distribution of E in S in terms of the absolute average deviation ("AAD") from D of the r-values assigned to the words in S. For a content node that corresponds to a string, the "node deviation" of the node is this absolute average deviation. Because r-values assigned to words are non-negative, the ratio AAD/D cannot exceed 2. Embodiments of the present invention define the "distribution score" function $\Delta$ so that $\Delta=1$ if D=0 and $\Delta=1-$AAD/(2*D) if D≠0. $\Delta$ will take values between 0 and 1. A high value for $\Delta$ indicates an even distribution of E in S. A low value for A indicates an uneven distribution of E in S. In alternative embodiments of the present invention, $\Delta=0$ if D=0.

In alternative embodiments of the present invention, median absolute deviation, or standard deviation, or variance, may be used in placed of average absolute deviation in evaluating evenness of distributions. The characterization of distributions may be refined in terms of higher moments.

D. Relevance Center

Embodiments of the present invention capture the "relevance center" ("r-center") of occurrences of E in S according to the following formula: $(\Sigma_{1 \leq i \leq n}(v_i * i))/(\Sigma_{1 \leq i \leq n} v_i)$, where n is the number of words in S, and where $v_i$ is the r-value assigned to the i-th word, with the first word in the string counting as the $1^{st}$ word, rather than the 0-th word, and so on.

In various embodiments of the present invention, the r-values assigned to words for purposes of calculating the relevance center may use a distance attenuation exponent that differs from the distance attenuation exponent that's used to assign r-values to words for purposes of calculating density and distribution.

Alternative embodiments of the present invention capture the relevance center of occurrences of E in S according to the following formula: $(\Sigma_{1 \leq i \leq k} p_i)/k$, where k is the number of occurrences of E in S, and where $p_i$ is the position of the i-th occurrence of E, with the position of the first word in S counting as 1, and so on.

E. Overall Score

Embodiments of the present invention assign an overall score for S as a match for E according the following formula: $c_1 * D + c_2 * \Delta$, where D is density as defined in paragraph 0044, where $\Delta$ is as defined in paragraph 0046, and where c1 and c2 are positive real numbers such that $c_1 + c_2 \leq 1$. Note that $0 \leq D \leq 1$ and $0 \leq \Delta \leq 1$, so $0 \leq (c_1 * D + c_2 * \Delta) \leq 1$. The values of $c_1$ and $c_2$ can be tuned as desired to adjust the relative importance of density and distribution in judging the relevance of S for E. Note that in ranking search results, properties in addition to D and $\Delta$, such as string size, may be taken into account. The relative importance of these additional properties can be tuned as desired by ensuring that each property P takes values between 0 and 1, and using a formula of the form $\Sigma_{1 \leq i \leq m}(c_i * P_i)$, where there's a total of m properties and where $\Sigma_{1 \leq i \leq m} c_i \leq 1$, to calculate overall score.

III. Structural Proximity Search Over Strings

A. Assignment of r-Values to Words

Note that proximity cannot be deduced from densities and r-centers. Suppose that in string $S_1$, occurrences of haydn are concentrated at the beginning and at the end of the string, while occurrences of boccherini are concentrated at the middle of the string. In string $S_2$, occurrences of both haydn and boccherini are concentrated at the middle of the string. $S_1$ and $S_2$ may have nearly identical densities and r-centers for haydn, and may have nearly identical densities and r-centers for boccherini, while the proximity of haydn and boccherini is much greater for $S_2$ than for $S_1$.

Given search expression $E_1$ ## $E_2$ ## ... ## $E_m$, where $E_1 \ldots E_m$ are search expressions, and given a string S, embodiments of the present invention assign a r-value to each word in S according to the following conditions: (i) if for some i, $1 \leq i \leq m$, the r-value of $E_i$ is 0, then each word in the string is assigned a r-value of 0 for $E_1$ ## $E_2$ ## ... ## $E_m$; (ii) if S contains at least one occurrence each of $E_1, \ldots, E_m$, then for any word W in S, the r-value assigned to W is the geometric mean of the r-values assigned to W for $E_1, \ldots, E_m$.

In alternative embodiments of the invention, the r-value assigned to W for case (ii) in accordance with paragraph 0053 is the arithmetic mean of the r-values assigned to W for $E_1, \ldots, E_m$. In other alternative embodiments of the invention, the r-value assigned to W is the minimum of the r-values assigned to W for $E_1, \ldots, E_m$. In the discussion that follows, unless stated otherwise, it's assumed that the r-value assigned to W is the geometric mean of the r-values assigned to W for $E_1, \ldots, E_m$.

In alternative embodiments of the present invention, condition (i) in accordance with paragraph 0053 is omitted and condition (ii) uses some function other than the geometric mean. According to these embodiments, S can match haydn ## boccherini even if it doesn't match haydn.

Given search expression $E_1$ %% $E_2$ %% ... %% $E_m$, where $E_1 \ldots E_m$ are search expressions, and given a string S, embodiments of the present invention assign a r-value to each word W in S according to the following condition: the r-value assigned to W is the maximum of the r-values assigned to W for $E_1, \ldots, E_m$.

Given search expression ~E, where E is a search expression, and given a string S, embodiments of the present invention assign a r-value to each word W in S according to the following condition: the r-value assigned to W is 1 minus the r-value assigned to W for E.

Note that neither ## nor %% is an associative operator. Thus in general, $E_1$ ## ($E_2$ ## $E_3$) and ($E_1$ ## $E_2$) ## $E_3$ will assign different r-values to words. Further, in general $E_1$ ## $E_2$ ## $E_3$ will assign r-values to words differently than either $E_1$ ## ($E_2$ ## $E_3$) or ($E_1$ ## $E_2$) ## $E_3$.

Note further that by these definitions, assignment of r-values to words for a complex search expressions proceeds recursively over the constituents of the search expression, from bottom to top.

B. Virtual Matches for Structural Proximity Search

Suppose $E_1$ and $E_2$ are atomic search terms. If $E_1$ has $k_1$ occurrences in S, and $E_2$ has $k_2$ occurrences in S, consider the $k_1 * k_2$ distinct pairs formed by taking an occurrence of $E_1$ as the first member of the pair and an occurrence of $E_2$ as the second member of the pair. In alternative embodiments of the present invention, each of these pairs is taken as a "virtual match" for $E_1$ ## $E_2$. Similarly, virtual matches for $E_1$ ## $E_2$ ## ... ## $E_m$, where $E_1, \ldots E_m$ are atomic search terms, are taken as m-tuples of occurrences, where the i-th member of such an m-tuple is an occurrence of $E_i$.

For $E_1$ ## ($E_2$ ## $E_3$), where $E_1$, $E_2$, and $E_3$ are atomic search terms, consider the distinct pairs formed by taking an occurrence of $E_1$ as the first member of the pair, and a virtual match for $E_1$ ## $E_2$, as defined in the preceding paragraph, as the second member of the pair. In embodiments of the present invention, each of these pairs is taken as a virtual match for $E_1$ ## ($E_2$ ## $E_3$). Virtual matches for arbitrarily complex search expressions built up from atomic search terms through applications of ## are defined in similar fashion.

Embodiments of the present invention identify the position of a virtual match with its relevance center. Embodiments of the present invention also assign "weights" to virtual matches. Weights assigned to virtual matches compare with weights of 1 that are assigned to occurrences of atomic search terms.

Embodiments of the present invention assign a relevance center ("r-center") to a tuple that's a virtual match for $E_1$ ## $E_2$ ## ... ## $E_m$, where $E_1, \ldots, E_m$ are atomic search terms, according to the formula $(\Sigma_{1 \leq i \leq m} p_i)/m$, where $p_i$ is the position of the i-th member of the virtual match, with the position of the first word in S counting as 1, and so on.

Embodiments of the present invention assign a weight to a tuple that's a virtual match for $E_1$ ## $E_2$ ## ... ## $E_m$, where $E_1, \ldots, E_m$ are atomic search terms, as $\Sigma_{1 \leq i \leq m}(1/(1+d_i)^x)$, where x (the "distance attenuation exponent") is a positive real number, and where $d_i$ is the distance from the i-th member of the virtual match to the r-center of the virtual match.

For $E_1$ ## $E_2$ ## ... ## $E_m$, where $E_1, \ldots E_m$ are search expressions built up from atomic search terms through applications of ##, embodiments of the present invention assign a relevance center to a tuple that's a virtual match for $E_1$ ## $E_2$ ## ... ## $E_m$ as $(\Sigma_{1 \leq i \leq m}(w_i * p_i)/(\Sigma_{1 \leq i \leq m}(w_i))$, where $w_i$ is the weight assigned to the i-th member of the virtual match, and where $p_i$ is the r-center of the i-th member of the virtual match, with the position of the first word in S counting as 1, and so on.

Embodiments of the present invention assign a weight to a tuple that's a virtual match for $E_1$ ## $E_2$ ## ... ## $E_m$ as $\Sigma_{1 \leq i \leq m}(w_i/(1+d_i)^x)$, where x is the distance attenuation exponent, where $w_i$ is the weight assigned to the i-th member of the virtual match, and where $d_i$ is the distance from the i-th member of the virtual match to the r-center of the virtual match.

Note that by these definitions, assignments of r-centers and weights to virtual matches for search expressions proceed recursively over the constituents of search expressions, from bottom to top. For a given search expression constituent and a given virtual match for the search expression, first its r-center is calculated, based on the r-centers and weights of its immediate sub-constituents. Then the weight of the given search expression constituent is calculated, based on its r-center and the weights of its immediate sub-constituents.

Embodiments of the present invention assimilate virtual matches and occurrences of atomic search terms. Virtual matches may be treated with methods of the present invention that apply to occurrences of atomic search terms. They may also be treated according to prior art methods that apply to occurrences of atomic search terms.

Embodiments of the present invention calculate densities, relevance centers, distributions, and overall scores based on virtual matches. In the embodiments of the present invention that are described below, densities, relevance centers, distributions, and overall scores are calculated on the basis of assignments of r-values, as described in paragraphs 0052-0059 above and paragraphs 0085-0098 below.

Alternative embodiments of the present invention evaluate a string S as a match for atomic search term E by evaluating S as a match for E ## E. Other alternative embodiments evaluate a string S as match for atomic search term E by evaluating S as a match for other search expressions composed from E and ##.

C. Density, Relevance Center, Distribution, Overall Score

Once r-values are assigned to words for a search expression that's built from atomic search terms with structural proximity operators, embodiments of the present invention calculate densities, distributions, relevance centers, and overall scores as in paragraphs 0044-0051.

IV. Search within Higher Content Constituents

As noted in paragraph 0025, embodiments of the present invention walk the parse trees associated with markup or other content from bottom to top. Alternative embodiments walk trees according to other orderings of tree constituents. Applicable content includes but is not limited to Web pages, XML documents, text documents, and database records and other database structures. In what follows, constituents of these parse trees will be called "content constituents."

A. Information from Layout Structures

Embodiments of the present invention use information derived from layout structures to supplement the parse trees associated with content. In particular, embodiments of the present information annotate nodes of the parse tree with measurement information. Measurement engine 113 in FIG. 1 is a module that provides measurement information. Web browser layout modules provide measurement engine functionality. Measurement information includes, but isn't limited to, width and height, horizontal and vertical position, length in characters (for texts), and size of referenced file (for images, videos, and so on). Some measurement information is readily available. Text lengths are apparent in the tree itself. Widths and heights may be specified as node attributes, in pixels or in other units. The size of a file can be obtained by downloading the file. However, other potentially useful measurement information requires non-trivial computation. For HTML files, browser rendering engines compute constituent dimensions and positions. While browser rendering engines mostly incorporate the same standards, they yield different measurement results in some cases. And some measurement results depend on such properties of the client as screen resolution, window width, window height, and browser text size setting. These dependencies may be overt, as when a constituent width is specified (perhaps indirectly) as a percentage of window width. Scripts may affect constituent measurements. Despite these challenges, it's still practical to derive a useful range of measurement results. If the relevant modules of a browser rendering engine are available, these modules can be called as needed. Cross-browser inconsistencies will be largely insignificant for purposes of content search. Short of having an engine that fully incorporates DHTML rendering standards, lightweight modules can estimate constituent measurements. For example, the area of a text component may be roughly estimated based on font and text length. The measurement information that's most useful for content extraction purposes tends involve low-level constituents. To a great extent, measurements of these constituents are invariant, or vary relatively little, as client display parameters vary.

In addition, embodiments of the present invention insert "virtual constituents" into parse trees. Some documents include constituents that are far apart in the parsed structure for the document, but near each other in the window (or printed page) when the document is rendered. For example, an HTML Web page may contain article text in a table cell, while a captioned image that's associated with the article is in a table cell belonging to a different table, with the two tables having no common ancestor below the body constituent, and with each of these two tables having multiple levels of ancestor intervening between it and the body constituent. Yet in this example, the captioned image is rendered to the immediate right of the article text. Embodiments of the present invention posit virtual constituents that contain constituents of the parse tree as sub-constituents. For the article example just described, an article constituent is posited that includes both the article text and the captioned image. Embodiments of the present invention insert virtual constituents into the parse tree under the root of the parse tree, or elsewhere. Sub-constituents of virtual constituents are then deleted from their original positions in the parse tree. In alternative embodiments, immediate sub-constituents of virtual constituents retain their original parents in the parse tree. In these embodiments, virtual constituents are inserted in what becomes (if it is not already) a directed acylic graph that is not a tree, with some nodes having multiple parents. In other alternative embodiments, an "deduced semantic tree" is built as a data structure distinct from the markup parse tree. Nodes of the deduced semantic tree correspond to instances of content categories, where articles, captioned images, and captions are examples of content categories. In these embodiments, while markup parse trees and deduced semantic trees are distinct, nodes of deduced semantic trees may be annotated with pointers to nodes of markup parse trees, and vice-versa.

B. Geometry of Relevance

A markup file that is intended to be laid out by a specific class of layout engines typically has a string structure, a tree structure, and a layout structure. Other tree-based content sources at least have string structures and tree structures. In determining the degree to which a content constituent N matches a search expression E, embodiments of the present invention assign relative sizes to the children of N, assign relative distances between the children of N, and correlate distances within the children of N with distances between the children of N. These assignments of sizes and distances capture what may be called a "geometry of relevance." The relative sizes of children of N influence the relative degree to which children's matches for E affect N's match for E. The relative distances between children of N affect matches for structural proximity, and affect the evenness of match distributions. In the discussion that follows, an assignment of size for purposes of determining relevance will be called a "relevance size" or "r-size," and an assignment of distance for purposes of determining relevance will be called a "relevance distance" or "r-distance." In the interest of clarity, the discussion below separates the determination of r-distances from the treatment of how relevance attenuates with r-distance. Thus the attenuation function isn't built into the definition of r-distance. For example, distance in words may count as r-distance within a string, while mutual relevance may be considered to vary inversely with r-distance.

String structures, tree structures, and layout structures may suggest very different relative sizes of constituents in particular cases, and may suggest very different relative distances between constituents in particular cases. For example, for text laid out in columns, the last word in the leftmost column is adjacent to the first word in the next column in string structure, but these two words are far from adjacent in layout. For another example, an image that occupies a large area in layout may correspond to a very small substring of the terminal string of a markup file (whether or not the image node has an attribute similar to HTML ALT, with a value that's subject to string search). For another example, two words that are separated by 20 words in the terminal string of an HTML file, where 10 of these words correspond to end tags and the other 10 correspond to simple start tags, are much farther apart in tree structure than are two words with a common TEXT parent that are separated by 20 words.

Embodiments of the present invention assign r-sizes and r-distances in a bottom-up traversal of the parse tree, where the parse tree has been annotated with measurement information, and where virtual constituents have possibly been inserted, as discussed in paragraph 0074 above. Alternative embodiments assign r-sizes and r-distances in a bottom-up traversal of the deduced semantic tree, where the deduced semantic tree has been constructed as discussed in paragraph 0074 above. Embodiments of the present invention assign r-sizes and r-distances, and also calculate match densities, match r-centers, match distributions, and match scores, in a single bottom-up traversal of the enhanced parse tree, or in a single bottom-up traversal of the deduced semantic tree. Alternative embodiments walk trees according to other orderings of tree constituents.

In an ideally simple scenario, the terminal nodes of the enhanced parse tree are texts and graphics. All texts use the same font. The sizes of texts correspond to their word counts. The relative sizes of texts and graphics are determined by a fixed conversion factor c, so that a text with n words is counted as the same r-size as a graphic with a rendered area of c*n square pixels. The r-size of a non-terminal node is the sum of the r-sizes of its children. Graphics are considered to have a single internal position. Every word of a string is considered to be a position within the string. Given a pre-terminal node N that dominates some text nodes and some graphic nodes, for purposes of calculating r-distances between positions in child nodes, the child nodes are considered to be concatenated together from left to right, with a graphic with area A counting for the same distance as A/c words. For example, suppose that N's children in left-to-right order are a text node with 500 words, a graphic with area of 20,000 square pixels, and a text node with 1000 words. Suppose further than 20,000 pixels counts as equivalent to 100 words for purposes of calculating both r-sizes and r-distances. Then N has an r-size equivalent of 1600 words. The r-distance between word position 200 in the first child, and word position 700 in the last child, is (500−200)+100+700=1100 word-unit equivalents. The r-distance between word position 200 in the first child, and the sole position in the graphic, is 500−200=300 word-unit equivalents. The r-distance between word position 700 in the last child, and the sole position in the graphic, is 700 word-unit equivalents. This treatment generalizes in an obvious way to higher nodes.

This ideally simple scenario typically fails to apply for real content. Consider a scenario where a content constituent N corresponds to an encyclopedia article. N has children $N_1, \ldots, N_6$ in left-to-right order. $N_1$ is a header constituent that includes the title of the article. $N_2, N_3$, and $N_5$ are sections of the article. $N_4$ is a photograph and $N_6$ is a video. Given a search expression E, matches within header $N_1$ are more significant in determining the relevance of N to E than are matches within any of the other children. Thus while $N_1$ contains far fewer words than $N_2$ (for example), its r-size is much greater. This illustrates what will be called "boosting" in the discussion below. Similarly, the video is rendered in a smaller area than the photograph, but because it's a video, in this scenario its r-size is considered to be greater than the r-size of the photograph. Sections $N_2$ and $N_3$ concern somewhat different sub-topics of the article topic. Therefore, for purposes of calculating r-distance, there's a sort of gulf between $N_2$ and $N_3$, with the last word of $N_2$ considered to be much more than one word away from the first word of $N_3$. This illustrates what will be called "warping" in the discussion below. Moreover, for any two positions $p_{2,1}$ and $p_{2,2}$ within $N_2$, and for any two positions $p_{3,1}$ and $p_{3,2}$ within $N_3$, the r-distance between $p_{2,1}$ and $p_{3,1}$ equals the r-distance between $p_{2,2}$ and $p_{3,2}$. This illustrates what will be called "distance branching" in the discussion below. When distances branch, the triangle equality $(d(p_1, p_3)=d(p_1, p_2)+d(p_2, p_3))$ does not apply. Depending on how distances are assigned, the triangle inequality $(d(p_1, p_3) \leq d(p_1, p_2)+d(p_2, p_3))$ may not apply either. Selected further illustrations of distance branching in this scenario are as follows: the r-distance between $N_2$ and $N_3$ equals the r-distance between $N_2$ and $N_5$ equals the r-distance between $N_3$ and $N_5$. The r-distance between $N_1$ and $N_2$ (which is smaller than the r-distance between $N_2$ and $N_3$) equals the r-distance between $N_1$ and $N_3$ equals the r-distance between $N_1$ and $N_4$ equals the r-distance between $N_1$ and $N_5$ equals the r-distance between $N_1$ and $N_6$. A full specification of relevance geometry for an enhanced parse tree or for a deduced semantic tree specifies (i) relevance centers ("r-centers") for nodes and (ii) how the spaces corresponding to child nodes embed within the spaces corresponding to parent nodes. (ii) implies specification of the r-distances between arbitrary positions in arbitrary sibling nodes. In some cases, the relevance geometries of nodes can be modeled as subsets of $R^n$, where spaces corresponding to child nodes are possibly transformed and then embedded in the spaces corresponding to parent nodes. In some cases, more abstract geometries will be more natural.

Boosting, warping, distance branching and other like deformations may be inferred with more or less confidence from knowledge of markup or other content authoring languages (for example, text under an HTML H1 node is boosted to a greater extent than text under an H2 node), or may be inferred with more or less confidence from layout structures (for example, as intervening white space increases, or as intervening border treatment becomes more prominent, the warped distance between adjacent constituents increases), or may be inferred with more or less confidence from knowledge of content categories (for example, within a constituent that comprises multiple product descriptions, the r-distance between any two product descriptions is the same). Alternatively, guidance on r-sizes and r-distances may be provided by supplemental authoring. This supplemental authoring may be reflected in the content sources themselves, or may be stored independently for use with specific content sources (for example, for use with all news articles from a particular Web site).

C. Recursive Evaluation of Content Constituents

Embodiments of the present invention evaluate search expressions on sub-constituents of documents, and thereby support applications that return document sub-constituents in response to search requests.

Given a search expression E and a document U, embodiments of the present invention walk the tree associated with U, from bottom to top. Alternative embodiments walk trees according to other orderings of tree constituents. At each node, it's first determined whether the node is a candidate for evaluation of E. If it is, the relevance geometry presented by the node's children is then calculated. Then E is evaluated for the node, starting with E's terminal sub-expressions, and working from bottom to top. Note that a node may be a candidate for evaluation of E even if it's not a candidate response to the search request—evaluation of the node may be a necessary step in the evaluation of a higher constituent that's a candidate response.

The result of evaluation is assignment of overall scores to constituents of U as matches for E. In traversing U, various embodiments of the present invention make various data structures calculated for lower nodes available for use in calculating data structures for higher nodes. Some embodiments of the present invention store all the data structures that have been calculated for lower nodes on those lower nodes, so that when data structures for higher nodes are calculated, the lower nodes may be re-traversed to retrieve relevant data structures. Other embodiments of the present invention eliminate re-traversals by passing up encapsulations of the data structures that have been calculated for lower nodes. These encapsulations take various forms in various embodiments of the invention. At one extreme, fully detailed records of occurrences of E's constituent atomic search expressions can be passed up the tree associated with U, together with all calculations related to evaluations of sub-expressions of E. In the interest of efficiency, it may be preferred to limit the data that's available when a node of U is visited. At an extreme, when a node N of the tree associated with U is visited, the only data that's available from calculations performed during the traversal of N's sub-constituents is any overall evaluation scores for E that have been assigned to children of N. Other embodiments of the present invention make available the following data calculated for descendants of N when evaluating E for N: for each child N' of N, the node deviation of E for N', and for each sub-expression E' of E, the density of E' for N' and the relevance center of E' for N'. Yet other embodiments of the present invention supplement the node deviation of E for N' with more detailed information about the distribution of matches for E within N', as will be discussed below. Yet other embodiments of the present invention use alternative encapsulations of matches for E and sub-expression of E in lower nodes.

Suppose that the relevance geometry of node N of document U has been calculated, that search expression E has been evaluated for descendants of N, and that the following data is available as a basis for evaluating E at N: for each child N' of N, the node deviation of E for N', and for each sub-expression E' of E, the density of E' for N' and the relevance center of E' for N'. The problem at hand is calculating the node deviation of E for N, and for each sub-expression E' of E, calculating the density of E' for N and the r-center of E' for N. The results of these calculations can then be passed up to the parent of N.

D. Assignment of Relevance Values to Children

Embodiments of the present invention proceed by assigning a r-value for each sub-expression E' of E to each child N' of N. In embodiments of the present invention, assignment of r-values begins with the atomic search terms that are the terminal sub-expressions of E, and works from bottom to top.

Given an atomic sub-expression E' of E, and given a child N' of N, embodiments of the present invention assign a pre-normalized r-value for E' to N' according to the following conditions: (i) if the density of E' is zero for all children of N, then N' is assigned a pre-normalized r-value of 0 for E'; (ii) if at least one child of N has non-zero density for E', then the pre-normalized r-value assigned to N' for E' is $\Sigma_{1\leq i\leq k}(A_i*D_i/(1+d_i)^x)$, where k is the number of children of N, where x (the "distance attenuation exponent") is a positive real number, where $A_i$ is the r-size of the i-th child of N, where $D_i$ is the density of E' in the i-th child of N, and where $d_i$ is the r-distance between the r-center of N' and the r-center of E' in the i-th child of N.

Embodiments of the present invention calculate the r-value for atomic expression E' for child N' of N from the pre-normalized r-value v for E' for N' as $v/(\Sigma_{1\leq i\leq k}(A_i/(1+d_i)^x))$, where k is the number of children of N, where x is the distance attenuation exponent, where $A_i$ is the r-size of the i-th child of N, and where $d_i$ is the minimum r-distance between constituents of N' and constituents of the i-th child of N.

Given a sub-expression $E_1$ ## $E_2$ ... ## $E_m$ of E, the naïve "indirect" method calculates pre-normalized r-values for $E_1$ ## $E_2$ ... ## $E_m$ for the children of N from the previously calculated densities and r-centers of $E_1$ ## $E_2$ ... ## $E_m$ for the children of N, as follows: (i) if the density of $E_1$ ## $E_2$ ... ## $E_m$ is zero for all children of N, then child N' is assigned a pre-normalized r-value of 0 for $E_1$ ## $E_2$ ... ## $E_m$; (ii) if at least one child of N has non-zero density for $E_1$ ## $E_2$ ... ## $E_m$, then the pre-normalized r-value assigned to child N' for $E_1$ ## $E_2$ ... ## $E_m$ is $\Sigma_{1\leq i\leq k}(A_i*D_i/(1+d_i)^x)$, where k is the number of children of N, where x (the "distance attenuation exponent") is a positive real number, where $A_i$ is the r-size of the i-th child of N, where $D_i$ is the density of $E_1$ ## $E_2$ ... ## $E_m$ in the i-th child of N, and where $d_i$ is the r-distance between the r-center of N' and the r-center of $E_1$ ## $E_2$ ... ## $E_m$ in the i-th child of N. The pre-normalized r-value for $E_1$ ## $E_2$ ... ## $E_m$ that is calculated according to this naïve indirect method will be referred to below as the "indirect" pre-normalized r-value.

Given a sub-expression $E_1$ ## $E_2$ ... ## $E_m$ of E, where pre-normalized r-values for $E_1, \ldots, E_m$ have been calculated for the children of N, the naïve "direct" method calculates pre-normalized r-values for $E_1$ ## $E_2$ ... ## $E_m$ for the children of N as follows: the pre-normalized r-value assigned to child N' is the geometric mean of the pre-normalized r-values assigned to N' for $E_1, \ldots, E_m$. The pre-normalized r-value for $E_1$ ## $E_2$ ... ## $E_m$ that is calculated according to this naïve direct method will be referred to below as the "direct" pre-normalized r-value.

Suppose that E is haydn ## boccherini, and that N has two children, where the first child $N_1$ has a density of 0.1 for haydn, a density of 0 for boccherini, and a density of 0 for haydn ## boccherini, and where the second child $N_2$ has a density of 0 for haydn, a density of 0.1 for boccherini, and a density of 0 for haydn ## boccherini. By the indirect method, the children of N both receive pre-normalized r-values of 0 for haydn ## boccherini. Given that normalization does not affect pre-normalized r-values of 0, and given that the density of haydn ## boccherini for N will be calculated from the r-values for haydn ## boccherini assigned to children of N, N will be assigned a density of 0 for haydn ## boccherini. But N features occurrences of haydn (within $N_1$) in proximity to occurrences of boccherini (within $N_2$), so the naïve indirect method is clearly inadequate.

Next suppose that E is haydn ## boccherini, and that N has two children with identical r-sizes, where the first child $N_1$ has a density of 0.1 for haydn, a density of 0.05 for boccherini, and a density of 0.06 for haydn ## boccherini, and where the second child $N_2$ has a density of 0.05 for haydn, a density of 0.1 for boccherini, and a density of 0.06 for haydn ## boccherini. In $N_1$, the occurrences of boccherini are relatively sparse, and these occurrences are not in proximity to the relatively abundant occurrences of haydn. In $N_2$, the occurrences of haydn are relatively sparse, and these occurrences are not in proximity to the relatively abundant occurrences of boccherini. To make a contrasting case, let the densities of haydn and boccherini remain the same for $N_1$ and $N_2$, and let the density of haydn ## boccherini be 0.08 for both $N_1$ and $N_2$. In this second case, haydn and boccherini are in greater proximity within N than they are within the first case. The naïve direct method is unable to distinguish between these contrasting cases, and so is inadequate.

Embodiments of the present invention calculate pre-normalized r-values for $E_1$ ## $E_2$ ... ## $E_m$ via the direct method, with corrections applied according to the indirect method, thereby incorporating the advantages of both methods without incurring their respective disadvantages. More precisely, given a sub-expression $E_1$ ## $E_2$ ... ## $E_m$ of E, embodiments of the present invention calculate the pre-normalized r-value for $E_1$ ## $E_2$ ... ## $E_m$ for child N' of N from the previously calculated densities and r-centers of $E_1$ ## $E_2$ ... ## $E_m$ for the children of N, and from the previously calculated pre-normalized r-values for $E_1, \ldots, E_m$ for the children of N, as follows: (i) let $W_i$ be $A_i*D_i/(1+d_i)^x$, where x is the distance attenuation exponent, where $A_i$ is the r-size of the i-th child of N, where $D_i$ is the density of $E_1$ ## $E_2$ ... ## $E_m$ in the i-th child of N, and where $d_i$ is the r-distance between the r-center of N' and the r-center of $E_1$ ## $E_2$ ... ## $E_m$ in the i-th child of N. (ii) let $w_{i,j}$ be $A_i*D_{i,j}/(1+d_{i,j})^x$, where x is the distance attenuation exponent, where $A_i$ is the r-size of the i-th child of N, where $D_{i,j}$ is the density of $E_j$ in the i-th child of N, and where $d_{i,j}$ is the r-distance between the r-center of N' and the r-center of $E_j$ in the i-th child of N; (iii) let P be the product of the pre-normalized r-values of $E_1, \ldots, E_m$ for N'; (iv) the pre-normalized r-value assigned to N' for $E_1$ ## $E_2$ ... ## $E_m$ is $(P+\Sigma_{1\leq i\leq k}W_i^m - \Sigma_{1\leq i\leq k}(\Pi_{1\leq j\leq m}w_{i,j}))^{1/m}$, where k is the number of children of N.

Note that when P is expanded, $\Pi_{1\leq j\leq m}w_{i,j}$ corresponds to a capture that is not the most accurate capture of the weight of $E_1$ ## $E_2$ ... ## $E_m$ at the i-th child of N, as this weight is felt at N'. (iv) in paragraph 0092 replaces this capture with the more accurate $W_i^m$.

Embodiments of the present invention calculate the r-value for $E_1$ ## $E_2$ ... ## $E_m$ for child N' of N from the pre-normalized r-value v for $E_1$ ## $E_2$ ... ## $E_m$ for N' as $v/(\Sigma_{1\leq i\leq k}(A_i/(1+d_i)^x))$, where k is the number of children of N, where x is the distance attenuation exponent, where $A_i$ is the r-size of the i-th child of N, and where $d_i$ is the minimum r-distance between constituents of N' and constituents of the i-th child of N.

Given a child N' of N and given search expressions $E_1, \ldots, E_m$, where the r-values for $E_1, \ldots, E_m$ for N' have been calculated, embodiments of the present invention set the r-value for N' for $E_1$ %% $E_2$ %% ... %% $E_m$ as the maximum of the r-values assigned to N' for $E_1, \ldots, E_m$.

Given a child N' of N and given search expression E, where the r-values for E for N' has been calculated, embodiments of the present invention set the r-value for N' for ~E as the one minus the r-value assigned to N' for E.

Calculations of r-values as described above applies recursively over sub-expressions of search expressions, and recursively over sub-constituents of content constituents, as illustrated in FIG. 2 and FIG. 3. Note that words (and/or characters) may be considered to be sub-constituents of texts in different embodiments. Other embodiments omit selected steps in the computations in paragraphs 0092 and 0094, and/or replace closed forms in paragraphs 0092 and 0094 with simpler closed forms. Note, however, that the embodiments in paragraphs 0092 and 0094 are entirely compatible with efficient search.

Note that a child of N can receive a non-zero r-value for a search expression even if its own density for the search expression is zero, and even if its own density is zero for all the sub-expressions of the search expression. Suppose that N is a Web page that presents information on composers of the classical period. A central box contains a description of the musical characteristics of the classical style, without mentioning any composers. The periphery of the page contains capsule biographies of various classical composers, including Haydn and Boccherini. No composer's biography mentions any other composer. The r-distance between the central box and any composer biography is much less than the r-distance between any two composer biographies. The central box receives non-zero r-values for haydn and for boccherini, and therefore receives a non-zero r-value for haydn ## boccherini. This constituent is therefore a candidate response to the search request haydn ## boccherini. It should be emphasized that in these embodiments, the relevance of the musical description to the search request is deduced entirely from the Web page that contains the musical description. No learning process over text corpora is involved. The user, or information worker, is provided with a means to explicitly formulate search requests that leverage co-occurrences of search terms. (Suppose that the central box in this example is replaced by an advertisement that is not a valid response to the search request haydn ## boccherini. Most advertisements in Web pages can be identified by well-known earmarks in HTML code. The relevance geometry of the Web page can be calculated so that the advertisement is placed at a suitably large r-distance from the composer biographies. Alternatively, an orthogonal mechanism can exclude the advertisement as a response to the search request. The same alternatives apply for other content whose relevance can be judged independently of how the content is placed in tree and layout structures.)

E. Relevance Centers for Parent Content Node

Suppose that for purposes of relevance geometry, the parent content node corresponds to a region of $R^2$, with its children corresponding to subregions. Embodiments of the present invention then capture the "relevance center" ("r-center") of matches for search expression E for a content node N according to the following two formulas: $x=(\Sigma_{1 \leq i \leq n}(A_i*v_i*x_i))/\Sigma_{1 \leq i \leq n}(A_i*v_i))$, and $y=(\Sigma_{1 \leq i \leq n}(A_i*v_i*y_i))/(\Sigma_{1 \leq i \leq n}(A_i*v_i))$, where n is the number of children of N, where $A_i$ is the r-size of the i-th child of N, where $v_i$ is the r-value for E assigned to the i-th child of N, where x is the x-coordinate of the r-center for E for N, where y is the y-coordinate of the r-center for E for N, where $x_i$ is the x-coordinate of the r-center for E for the i-th child of N, and where $y_i$ is the y-coordinate of the r-center for E for the i-th child of N. Note that the r-center of the parent node may not lie within any of the subregions corresponding to child nodes.

More generally, given a specification of how the spaces corresponding child nodes embed within the spaces corresponding to parent nodes, the ("r-center") of matches for search expression E for a content node N is $(\Sigma_{1 \leq i \leq n}(A_i*v_i*p_i))/(\Sigma_{1 \leq i \leq n}(A_i*v_i))$, where n is the number of children of N, where $A_i$ is the r-size of the i-th child of N, where $v_i$ is the r-value for E assigned to the i-th child of N, and where $p_i$ is the position of the r-center for E for the i-th child of N in the space corresponding to N. The relevance geometry for the parent node may supply for each child node a function (the "displacement" function) whose inputs are a match value and a position within the region corresponding to the child node, and whose output is a displacement vector that applies to positions within the region corresponding to the parent node. A position within a child node may be specified as a displacement vector applied to the r-center of the child node itself. Further, the relevance geometry for the parent node may be such that applications of displacement vectors are associative and commutative. Embodiments of the present invention then capture the "relevance center" ("r-center") of matches for search expression E for a content node N by calculating the displacement vectors $f_i(v_i, p_i)$, where $f_i$ is the displacement function corresponding to the i-th child of N, where $v_i$ is the r-value for E assigned to the i-th child of N, and where $p_i$ is the position of the r-center of E in the i-th child of N, and then successively applying these displacement vectors, applying the first vector to the r-center of the parent node itself.

F. Densities for Parent Content Node

Embodiments of the present invention capture the density of matches for search expression E for a content node N as $(\Sigma_{1 \leq i \leq n}(A_i*v_i))/(\Sigma_{1 \leq i \leq n}A_i)$, where n is the number of children of N, where $A_i$ is the r-size of the i-th child of N, and where $v_i$ is the r-value for E assigned to the i-th child of N.

G. Distribution for Parent Content Node

Given that content node N has density D for search expression E, given that text child N' of N has density D' for E, and given that B' is the average absolute deviation from D' for the r-values assigned to the words of N' as matches for E, the average absolute deviation from D for the r-values assigned to the children of N' as matches for E cannot be deduced from D, D', and B' without additional information on how r-values for matches for E are distributed among the words of N'. For example, consider the case where D<D'. Suppose that $n_1$ words in N have r-values less than or equal to D. Suppose further that $n_2$ words have r-values greater than D and less than or equal to D' and that the r-values of these $n_2$ words are $x_1, \ldots x_{n_2}$. And suppose that $n_3$ words have r-values greater than D'. Then the average absolute deviation from D for the r-values assigned to the children of N' is $B'+n_3/n(D'-D)-n_1/n(D'-D)+2/n*\Sigma_{1 \leq i \leq n_2}x_i-n_2/n(D'+D)$.

Various embodiments of the present invention pass varying degrees of detail concerning the distributions of r-values for search matches up the tree (which may be a parse tree, an enhanced parse tree, or a deduced semantic tree), or store varying degrees of detail concerning distributions of r-values on lower nodes in the tree, where this information can be accessed by re-traversing lower nodes when distributions are calculated for higher nodes. At one extreme, only estimates of the average absolute deviations of a text node's children are available when the average absolute deviation of the node is estimated. At an opposite extreme, full details on distributions for lower nodes are available. Between these extremes, information on distribution bands for a node may be passed to the node's parent. The distribution bands may be more or less finely grained. For example, distribution bands might be as follows: r-value less than 0.5*density of parent, r-value greater than or equal to 0.5*density of parent and less than density of parent, r-value greater than or equal to density of parent and less than 2*density of parent, r-value greater than or equal to 2*density of parent. For each distribution band, the following may be passed up from text node N' for use in processing N, the parent node of N': the number of words of N' with r-values in the band. Together with the other data discussed in paragraph 00102, this will allow estimation of the average absolute deviation of the r-values assigned to words of N' as matches for E from the density of r-values for matches for E in N.

Alternative embodiments of the invention that use standard deviation, or variance, or higher moments to characterize distribution can similarly pass up varying degrees of detail concerning distributions in lower nodes.

Given that preterminal content node N has density D for search expression E, given that child N' of N has density D' for E, and given the absolute average deviation from D' for the r-values assigned to the words of N' as matches for E, embodiments of the present invention provide an exact or estimated "corrected average absolute deviation" from D for the r-values assigned to the words of N', as described in paragraphs 00102-00103. Embodiments of the present invention calculate the "weighted corrected absolute average deviation" of matches for search expression E for preterminal content node N as $(\Sigma_{1 \le i \le n}(A_i * C_i))/(\Sigma_{1 \le i \le n} A_i)$, where n is the number of children of N, where $A_i$ is the r-size of the i-th child of N, and where $C_i$ is the corrected average absolute deviation from D for the i-th child of N. The "node deviation" of a preterminal content node N for search expression E is the weighted corrected absolute average deviation of N for E. Recall that the node deviation for a text node N is the absolute average deviation of the r-values of the words of N from the arithmetic mean of the r-values of the words of N.

Figure 4:
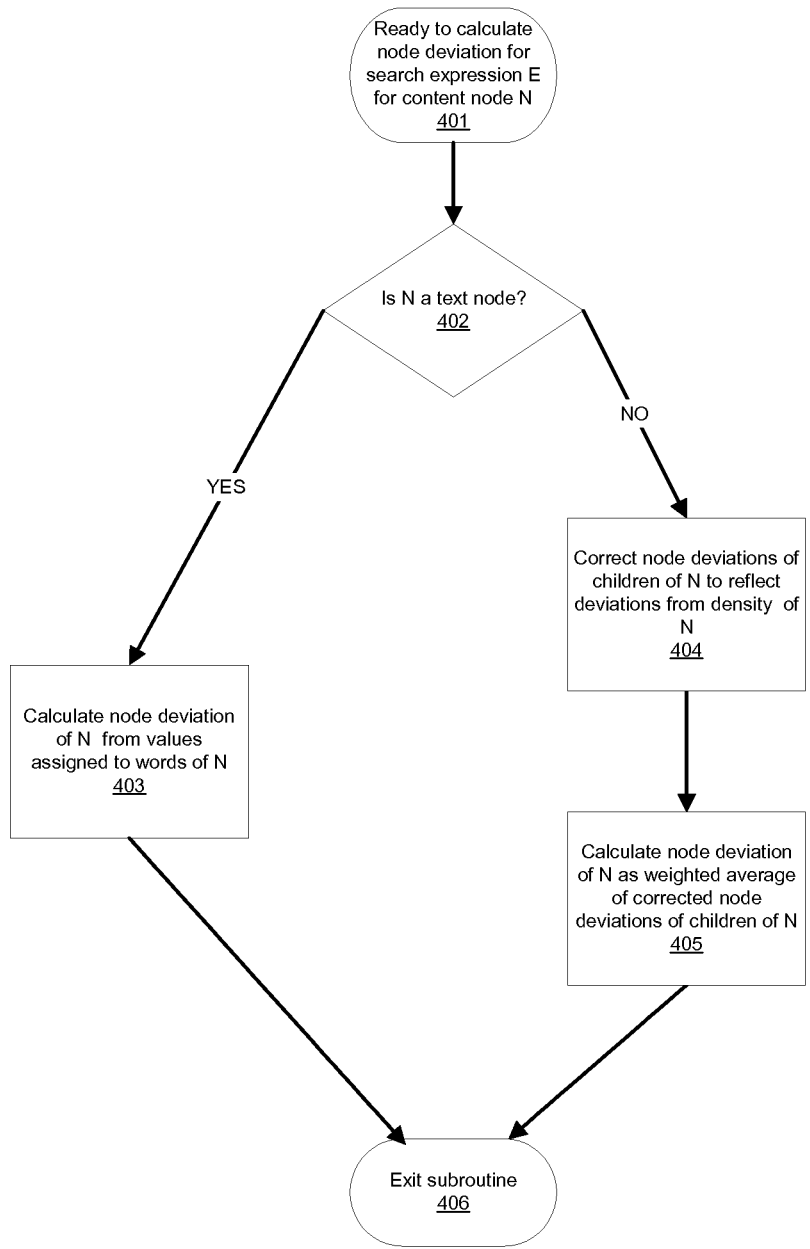

Embodiments of the present invention provide exact or estimated corrected node deviations for nodes whose children include higher nodes than text nodes as described in paragraphs 00102, 00103, and 00105, except that for a child N' that is higher than a text node, in place of the average absolute deviation, the node deviation of N' is used. Thus in the general case, given that the density of matches for search expression E for node N is D, embodiments of the present invention calculate the "weighted corrected node deviation" of matches for E for N as $(\Sigma_{1 \le i \le n}(A_i * C_i))/(\Sigma_{1 \le i \le n} A_i)$, where n is the number of children of N, where $A_i$ is the r-size of the i-th child of N, and where $C_i$ is the corrected node deviation from D for the i-th child of N. As illustrated in FIG. 4, embodiments of the present invention pass up the "node deviation" for N, defined as this weighted corrected node deviation, for use in calculating the node deviation of the parent of N.

Given a content node N and a search expression E such that the density for E on N is D and the node deviation for E on N is B, embodiments of the present invention define the "distribution score" function $\Delta$ so that $\Delta=1$ if $D=0$ and $\Delta=1-B/(2*D)$ if $D \ne 0$. A high value for $\Delta$ indicates an even distribution of E in N. A low value for $\Delta$ indicates an uneven distribution of E in N. In alternative embodiments of the present invention, $\Delta=0$ if $D=0$.

H. Overall Score

Embodiments of the present invention assign an overall score for content node N as a match for search expression E according the following formula: $c_1*D+c_2*\Delta$, where D is the density of E on N, where $\Delta$ is the distribution score for E on N, and where c1 and c2 are positive real numbers such that $c_1+c_2 \le 1$. Note that $0 \le D \le 1$ and $0 \le \Delta \le 1$, so $0 \le (c_1*D+c_2*\Delta) \le 1$. The values of $c_1$ and $c_2$ can be tuned as desired to adjust the relative importance of distribution and density in judging the relevance of N for E. Note that in ranking search results, properties in addition to D and $\Delta$, such as layout size, may be taken into account. These relative importance of these additional properties can be tuned as desired by ensuring that each property P takes values between 0 and 1, and using a formula of the form $\Sigma_{1 \le i \le m}(c_i*P_i)$, where there's a total of m properties and where $\Sigma_{1 \le i \le m}(c_i) \le 1$, to calculate overall score.

V. Embodiments that Forego Calculations of Relevance Values

Alternative embodiments of the present invention work as described above, except that they forego calculations of r-values for atomic search terms for words in strings, and/or forego calculations of r-values for proximity search expressions for words in strings, and/or forego calculations of r-values for search expressions for children of content nodes. For example, for atomic search terms and strings, these embodiments work like paragraphs 0038-0051 above, with the difference that words that match an atomic search term are treated as though they were assigned value 1, while all other words are treated as though they were assigned value 0.

These alternative embodiments are somewhat simpler conceptually. They skip computation steps, with slight savings in computation times. However, by themselves these alternative embodiments don't capture evenness of match distributions. These alternative embodiments don't allow a constituent to be a candidate response for a search expression E strictly by virtue of its proximity to constituents that contain atomic sub-expressions of E. For a search expression like haydn ## boccherini, these alternative embodiments fail to distinguish cases where the relevance center for occurrences of haydn happens to coincide with the relevance center for occurrences of boccherini, while no occurrence of haydn is near any occurrence of boccherini, from cases where every occurrence of haydn is near an occurrence of boccherini and vice-versa.

Given a string S and an atomic search expression E, a "maximal hitless sub-string" of S for E is a sub-string of S that (i) contains no occurrences of E and (ii) is not properly contained in a sub-string of S that contains no occurrences of E. Other alternative embodiments of the present invention capture evenness of match distributions within strings in terms of the lengths of maximal hitless sub-strings. These alternative embodiments conflate distributions that the embodiments described in paragraphs 0046-0047 and paragraphs 00102-00107 are able to distinguish.

VI. Applications to Sets of Documents

Embodiments of the present invention extend the methods described above to sets of documents. Examples of sets of documents include the following: (1) a set of documents within a file directory, (2) the set of Web pages within a Web site, or within a well-defined sub-site of a Web site, (3) the set of documents obtained by starting with a Web page, adding the Web pages that this Web page links to (perhaps following only those links that belong to a certain category of link), adding the Web pages that those pages link to, and so on, with a bound placed on the size of the set of documents, or a bound placed on the length of the link-chain connecting members of the set to the initial page.

Once the set of documents is organized in a tree, or more generally in a directed acyclic graph, with an associated relevance geometry, the methods described above apply straightforwardly. Simple default tree organizations and simple default relevance geometries are readily available. For example, tree organization of documents in a file directory can correspond to the tree organization of the directory. Tree organization of a set of Web pages obtained by following links can place directly linked-to documents as children of directly linking documents. For purposes of relevance geometry, it may be considered that there's a fixed distance d such that for any position p in any Web page, and for any position p' in any sibling of this first Web page, the distance between p and p' is d. Or it may be considered that relevance geometry derives from a particular two-dimensional layout that incorporates sibling Web pages.

VII. Identifying Content to which Structure Search Will be Applied

It may be wasteful to apply structured search to documents and other content selected at random. Given a search request in the form of a search expression E, embodiments of the present invention call external engines to identify and supply content to which structured search will be applied, as illustrated in FIG. 1. More specifically, occurrences of structural proximity conjunction in E may be replaced by occurrences of standard conjunction and occurrences of structural proximity disjunction may be replaced by occurrences of standard disjunction. Sub-expressions in the scope of the structural proximity complement operator are deleted. The resulting query E' is then submitted to an external search engine, which may be coupled with the full Web, or with a database of annotated cached documents, or with some other content source. Structured search based on the original search expression E is then applied to the results returned by the external search engine, respecting any ordering suggested by the external search engine. Note that sub-expressions of E that lie in the scope of the structural proximity complement operator are deleted before submission to the external search engine, so that the external search engine will not miss content that includes sub-constituents that match deleted sub-expressions and also includes sub-constituents that match E.

VIII. Complementary Content Selection Criteria

A response to a user's search request may be influenced by criteria other than quality of search match. Content constituents that render in smaller areas may be preferred to content constituents that render in larger areas, especially if the target device is small.

In contrasting cases, content constituents may be disfavored because they're too small. For example, a text constituent that consists solely of the word haydn is a poor candidate response to the search request haydn.

Embodiments of the present invention support explicit user requests for content that derives from a specific source or set of sources, including sets of sources that correspond to the results of previous content requests. Embodiments of the present invention also support explicit user requests for content that belongs to a specified category. For example, the user may request product descriptions that match boccherini. Categories of content may be characterized in terms of tree and/or layout structures. Such characterizations may be generic, or may be specific to particular content sources. For example, Web product descriptions may be characterized generically in terms of parsed and/or rendered HTML. Product descriptions may be similarly but much more narrowly characterized for a particular Web site. Characterizations of content categories may be stored in a category repository, as illustrated in FIG. 1. Cached content may be annotated to reflect which sub-constituents belong to which categories. Embodiments of the present invention also store information on the relevance geometry of constituents in category repositories.

Search requests may include additional predicates. For example, search requests may include predicates that specify string-based relationships, such as fixed-distance proximity relationships. Search requests may also include predicates that specify tree-based relationships, such as predicates that specify node properties, and properties that specify inter-node relationships. Tree-based relationships may refer to markup parse trees, to trees derived from string, markup, layout, and category information, or to other trees. Search requests may also includes predicates that specify graph-based relationships more generally.

Embodiments of the present invention use the && operator to interpret search requests that specify content categories, and to interpret search requests that include various predicates. For example, article matching "counterpoint" is interpreted as a request for N such that (N is an article) && (N matches "counterpoint"). Suppose that membership in content categories is evaluated as true or false (although these embodiments are compatible with evaluating membership in content categories as a matter of degree). Then according to these embodiments, the score for an article as a response to the search request article matching "counterpoint" is the same as score for the article as a match for counterpoint.

Search requests may also include explicit quantifiers, as in article that contains at least one captioned image, and as in article that contains exactly three captioned images.

Search requests may also include predicates that correspond to specified search algorithms, such as the algorithms described in paragraphs 0038-00111 above. For example, article that contains captioned image may be interpreted analogously to article that matches "counterpoint." As the number of occurrences of counterpoint within an article increases, as the distribution of occurrences becomes more even, and so on, the score for the article as a match for counterpoint increases. Similarly, according to the stated interpretation, as the number of captioned images within an article increases, as the distribution of captioned images within the article becomes more even, and so on, the score for the article as containing captioned images increases.

Search requests with Boolean and scalar-valued logical operators, with quantifiers, with predicates that specify string-based, tree-based, and graph-based relationships, with predicates that specify category membership, and with predicates that correspond to specified algorithms, may be embedded recursively. Embodiments of the present invention apply the algorithms of paragraphs 0052-00111 to the resulting complex search requests. For example, consider article matching "counterpoint" that contains captioned image matching "haydn," where contains is interpreted as described in paragraph 00121 above, and where && is used to interpret relative clauses. Following the algorithms in paragraphs 0052-00111 above, the constituents of this search request (which may be represented as match(N2, "haydn"), captionedImage(N2), match(N2, "haydn") && captionedImage (N2), article(N1), match(N1, "counterpoint"), contain(N1, (N2|match (N2, "haydn") && captionedImage(N2)), article (N1) && match(N1, "counterpoint") && contain(N1, (N2| (N2, "haydn") && captionedImage(N2))) are each evaluated at each node of the markup tree or deduced semantic tree. Embodiments of the invention use category information to optimize the evaluation. For example, when evaluating the search request article matching "counterpoint" that contains captioned image matching "haydn," if a constituent is known not to be a possible sub-constituent of an article, then the constituent need not be evaluated as a match for counterpoint. For another example, if a constituent is known not to be a possible super-constituent of captioned images, then the constituent need not be evaluated as to its containment of captioned images matching haydn. It should be noted that complex search requests may be embedded under the structural proximity operator ##, as in (product description matching "suit") ## (product description matching "tie").

Complex search requests may be annotated with indications of which constituents are to be returned. For example, (return product description matching "suit") ## (product description matching "tie") would return product descriptions matching "suit" that are in proximity to product descriptions matching "tie," but would not return product descriptions matching "tie" that are in proximity to product descriptions matching "suit."

Embodiments of the present invention support what may be called "constituent integrity" as a criterion for selecting content constituents. An "integral constituent" is more than the sum of its parts. In an integral constituent, the juxtaposition of sub-constituents adds to the meanings conveyed by the individual sub-constituents. To take a very simple example, consider an HTML product description that comprises the product name in one table cell, and the product price in another table cell. It's the juxtaposition of these two cells that conveys the information that this product has this price. Texts such as news articles and essays, or for that matter, novels and poems, are prime examples of integral constituents. So are comic strips. Integral constituents can be sub-constituents of other integral constituents. For example, a captioned image is an integral constituent that's a sub-constituent of a news article, which is also an integral constituent.

Constituent integrity may be a matter of degree, and ultimately, a matter of individual perception. There are nevertheless clear-cut contrasts among constituents in this respect. For example, a single news article is readily perceived as an integral constituent, even if it's split across multiple Web pages. In contrast, a constituent that's assembled from unrelated smaller constituents, or assembled from marginally related smaller constituents, is less readily perceived as integral. For example, an HTML table that includes a news article, lists of links to other articles, and advertisements may be very apparent visually when the containing page is rendered, but not readily perceived as an integral constituent. Some integral constituents retain all or most of their perceived integrity when certain of their sub-constituents are expurgated. (Thus the term "constituent integrity" is based on an imperfect metaphor.) For example, the text of a news article may include an embedded advertisement that can be expurgated and delivered separately from the news article without reducing the total information conveyed.

For some simply specified constituent categories, characteristics related to constituent integrity are fairly immediate. For example, paragraphs readily combine to form higher integral constituents. In the absence of full information about constituent integrity, some general principles can be used to infer with more or less confidence which constituents are integral. For example, the lowest ancestor constituent of a header constituent that meets one of (or better yet both) of the following two tunable conditions is likely to be integral: (1) the total amount of text contained in the higher constituent is much greater than the total amount of text contained in the header; (2) the rendered area of the higher constituent is much greater than the rendered area of the header. If the header constituent is rendered at the top of the higher constituent, that increases the likelihood that the higher constituent is integral. To take another example of inference of constituent integrity, a constituent is unlikely to be integral if it contains a large number of similar complex integral constituents, where these contained constituents are not known to be possible sub-constituents of higher integral constituents.

Concerning candidates for expurgation, embodiments of the present invention allow a category repository to include annotations as to members of which distinguished constituent categories may be expurgated from members of which other distinguished constituent categories.

IX. Presenting the Results of Structure Search

Embodiments of the present invention organize the output of a structured search into an annotated catalog of content constituents, as illustrated in FIG. 1 ("content constituent catalog" 115) Annotations may include indications of quality of search match, rendered size, constituent integrity, and degree to which a constituent corresponds to a user-specified constituent category Annotations may also include indications of which sub-constituents of a constituent returned by structured search are candidates for expurgation.

Embodiments of the present invention direct content constituent catalogs to a content selection engine that trades off among various content selection criteria to determine which content constituents to present in response to a user search request, and to determine the order in which content constituents will be presented. In some of these embodiments, the content selection engine communicates with a layout engine, as illustrated in FIG. 1. As the layout engine places content constituents according to layout criteria, it may generate very specific requirements that it can communicate to the content selection engine. For example, a layout in progress may have room for a constituent of a specific size. The layout engine can request a constituent of this size from the content selection engine, which can then supply the constituent of the required size that best satisfies the selection criteria in effect.

X. Illustrations of Subroutines

Referring now to FIG. 2, wherein a block diagram is shown illustrating the evaluation of a search expression E for a content constituent N, in accordance with various embodiments of the present invention. Note that a content node may be identified with the constituent that it dominates. "Content node" and "content constituent" are therefore used interchangeably. As illustrated, for the embodiments, if N is a terminal node 202, densities and relevance centers are calculated for N for all the sub-expressions of E 206. FIG. 3 illustrates in more detail these calculations of densities and relevance centers. If N is not a terminal node 202, and if the subroutine corresponding to FIG. 2 has not already been called for all the children of N 203, then this subroutine must first be called for all the children of N 204. Thus in these embodiments, calculation proceeds recursively over the sub-constituents of N, from bottom to top. If the subroutine corresponding to FIG. 2 has already been called for all the children of N 203, then the relevance geometry of N is determined 205. In various embodiments, this determination of relevance geometry proceeds as described in paragraphs 0075-0080 above. Densities and relevance centers are then calculated for N for all the sub-expressions of E 206. FIG. 3 illustrates in more detail these calculations of densities and relevance centers. The node deviation for the root search expression E for N is then calculated 207. FIG. 4 illustrates in more detail this calculation of the node deviation for N for E. The score for E for N is then calculated 208. In various embodiments, this score calculation proceeds as described in paragraphs 0051 and 00108 above.

Referring now to FIG. 3, wherein a block diagram is shown illustrating the calculation of r-values of search expression E for children of content node N, and illustrating the calculation of density and relevance center for E for N from these r-values, in accordance with various embodiments of the present invention. As illustrated, for the embodiments, if the subroutine corresponding to FIG. 3 has not already been called all immediate sub-expressions of E 302, then this subroutine must first be called for all immediate sub-expressions of E 303. Thus in these embodiments, calculation proceeds recursively over the sub-expressions of E, from bottom to top. If the subroutine corresponding to FIG. 3 has already been called for all the immediate sub-expressions of E 302, then r-values are calculated for E for children of N 304, 305, 307, 308, 309, 310, 311. If N is a text node 304 and if E is an atomic search term 305, then r-values for the words of E are calculated from the occurrences of E 307. In various embodiments, these r-value calculations proceed as described in paragraphs 0038-0043 above. If N is a text node 304 and if E is not an atomic search term 305, then r-values for the words of E are calculated from the r-values of E's immediate sub-expressions 308. In various embodiments, these r-value calculations proceed as described in paragraphs 0052-0059 above. If N is not a text node 304 and if E is an atomic search term 309, then r-values for E for the children of N are calculated from densities and relevance centers for E for the children of N 310. In various embodiments, these r-value calculations proceed as described in paragraphs 0085-0098 above. If N is not a text node 304 and if E is not an atomic search term 309, then r-values for E for the children of N are calculated from densities and relevance centers for E for the children of N 311. In various embodiments, these r-value calculations proceed as described in paragraphs 0085-0098 above. Note that according to the embodiments, if N is a text node, the children of N are the words of N. After r-values have been calculated for E for the children of N, the density and relevance center for E for N is calculated from these r-values 312. In various embodiments, calculation of density and relevance center proceeds as described in paragraphs 0044-0045, paragraphs 0048-0050, and paragraphs 0099-00101 above.

Referring now to FIG. 4, wherein a block diagram is shown illustrating the calculation of the node deviation for search expression E for content node N, in accordance with various embodiments of the present invention. If N is a text node 402, the node deviation for E for N is calculated from the r-values assigned to the words of N 403. In various embodiments, this node deviation calculation proceeds as described in paragraphs 0046-0047 and 0071 above. If N is not a text node 402, node deviations of the children of N are corrected to reflect deviations from the density of N 404. The node deviation of N is then calculated as the weighted average of the corrected node deviations of the children of N 405. In various embodiments, the calculation of corrected node deviations for the children of N, and the subsequent calculation of the node deviation for E for N, proceed as described in paragraphs 00102-00107 above.

XI. Search Scoring with Positional Sensitivity

An "atomic search scoring function" takes as input an atomic search expression and a structure, and outputs a score corresponding to the degree to which the structure matches the search expression. Examples of structures include strings of words, markup strings, trees corresponding to parsed markup, enhanced markup trees as described in paragraph 0074 above, deduced semantic trees as described in paragraph 0074 above, database records, and other database objects. Structures may be built recursively from lower structures (markup constituents from lower markup constituents, Web sites from markup documents, corpora of texts from text documents, XML repositories from XML documents, databases from records, and so on).

A "distance function" for a structure takes as input two sub-structures of the structure, each of which can at least hold one atomic search expression, and outputs a distance. (For example, for a structure corresponds to a string of words, with words themselves as sub-structures, inter-word distance corresponds to a distance function.)

A sub-structure is "atomic" if it can be fully occupied by an atomic search expression.

Two sub-structures $S_0$ and $S_1$ of S are "similarly located" in S if the set of distances between $S_0$ and other sub-structures of S is identical to the set of distances between $S_1$ and other sub-structures of S. (For example, in a four-word string with inter-word distance as the distance function, the first and fourth word positions are similarly located, and the second and third word positions are similarly located. For another example, suppose that S comprises n atomic sub-structures, that there are no sub-structures of S except these atomic sub-structures, and that the distance function for S can be captured by equally spacing the n atomic sub-structures around a circle, with the distance between two atomic sub-structures corresponding to the Euclidean distance between the corresponding points on the circle. Then all the atomic sub-structures of S are similarly located.)

Given a structure S with a distance function, where (i) atomic sub-structures $S_0$ and $S_1$ are not similarly located, (ii) an occurrence of atomic search expression E occupies atomic sub-structure $S_0$, and (iii) $S_1$ does not contain E, an "effective move" of E in S exchanges the contents of $S_0$ and $S_1$. An "effective move" for a set of atomic expressions $E_1, \ldots, E_n$ in S is an effective move of some $E_i$ (where $1 \leq i \leq n$) that does not exchange an occurrence of $E_i$ with an occurrence of some $E_j$ (where $j \neq i$ and $1 \leq j \leq n$). An "effective tandem move" for a set of atomic expressions $E_1, \ldots, E_n$ in S is a sequence of effective moves for $E_1, \ldots, E_n$ in S, where no consecutive or non-consecutive sub-sequence of moves exchanges an occurrence of some $E_i$ (where $1 \leq i \leq n$) with an occurrence of some $E_j$ (where $j \neq i$ and $1 \leq j \leq n$). An effective move for $E_1, \ldots, E_n$ in S is considered to be special case of an effective tandem move $E_1, \ldots, E_n$ in S. (For example, given S as the string "haydn boccherini mozart pleyel clementi" with inter-word distance as the distance function, a tandem effective move for haydn, boccherini in S can yield "mozart haydn boccherini pleyel clementi.")

Given a structure S with a distance function, an atomic search scoring function on the structure has "positional sensitivity" just in case an effective move of an atomic search expression E within the structure is guaranteed to change the score for E on S.

A "basic proximity search scoring function" takes as input two or more atomic search expressions and a structure, and outputs a score corresponding to the degree to which the atomic search expressions are in proximity within the structure. Given a structure S with a distance function, a basic proximity search scoring function has "positional sensitivity" just in case an effective tandem move of atomic search expressions $E_1, \ldots, E_n$ in S is guaranteed to change the score for $E_1, \ldots, E_n$ on S.

A scoring function for a search expression language that doesn't include a proximity operator has "positional sensitivity" if the scoring function has positional sensitivity for the atomic search expressions within the language. A scoring function for a search expression language that includes a binary or n-ary proximity operator has "positional sensitivity" if (i) the scoring function has positional sensitivity for the atomic search expressions within the language, and (ii) the scoring function has positional sensitivity for expressions in the language where the proximity operator is applied to atomic search expressions.

XII. Applications to Targeted Advertising

Various embodiments of the present invention associate search expressions with advertisements. Search expressions associated with advertisements may include structural proximity operators, or additional operators and predicates as described in paragraphs 00118-00122 above. Given a content constituent, and given a set advertisements, each with one or more associated search expressions, the content constituent can be scored for each of these search expressions according to methods described in paragraphs 0038-00113 above. The advertisements can then be ranked according to which advertisements have the best single associated search expression scores, or according to according to which advertisements have the best average associated search expression scores. The content constituent can then be delivered together with the highest ranking advertisements, subject to space, size, and other constraints.

Various embodiments of the present invention use proximity relationships to rank advertisements for a given user search request $E_u$ and a given content constituent N. Suppose that an advertisement is associated with search expressions $E_{a,1}, \ldots, E_{a,n}$. Suppose that prox is a proximity operator. Then various embodiments identify the score of the advertisement for $E_u$ and N as the maximum of the scores over $1 \leq i \leq n$ of ($E_{a,i}$ prox $E_u$) on N, or an average of the scores over $1 \leq i \leq n$ of ($E_{a,i}$ prox $E_u$) on N. In particular, various embodiments identify the score of the advertisement for $E_u$ and N as the maximum of the scores over $1 \leq i \leq n$ of ($E_{a,i}$ ## $E_u$) on N, or an average of the scores over $1 \leq i \leq n$ of ($E_{a,i}$ ## $E_u$) on N, where ## is the structural proximity operator as described in paragraphs 0052-00111 above. In the case where the $E_{a,i}$ are atomic, and where $E_u$ comprises a sequence or set of atomic search expressions $E_{u,1}, \ldots, E_{u,m}$, alternative embodiments identify the score of the advertisement for $E_u$ and N as the score on N of other expressions composed from $E_{a,1}, \ldots, E_{a,n}$ and $E_{u,1}, \ldots E_{u,m}$ by applying proximity operators.

XIII. Optimization and Refinement

Embodiments of the present invention accommodate assignment of varying weights to different atomic search expressions by a generalizing the formula $\Sigma_{1 \leq i \leq k}(1/(1+d_i)^r)$ in paragraph 38 to $\Sigma_{1 \leq i \leq k}(\epsilon/(1+d_i)^r)$, and by generalizing the formula $\Sigma_{1 \leq i \leq k}(1/(1+d_i)^r)$ in paragraph 39 to $\Sigma_{1 \leq i \leq n}(\epsilon/(1+d_i)^r)$, where $0 \leq \epsilon \leq 1$, with $\epsilon$ corresponding to the weight assigned to atomic search term E. Alternative embodiments generalize the formula $\Sigma_{1 \leq i \leq k}(1/(1+d_i)^r)$ in paragraph 38 to $\Sigma_{1 \leq i \leq k}(\epsilon/(1+d_i)^r)$, but retain the formula $\Sigma_{1 \leq i \leq n}(1/(1+d_i)^r)$ in paragraph 39 for purposes of normalization.

For sibling content nodes, the calculation of r-values in paragraphs 85-98 is quadratic in the number of siblings. For text strings, the calculation of r-values in paragraphs 38-43, and therefore in paragraphs 52-59, is quadratic in the number of words. Embodiments of the present invention establish a bound on the number of children of content nodes, and establish a bound on the size of undivided text strings. When the number of children of a content node N exceeds the established bound for content nodes, the children of N become grandchildren of N, and a level of nodes is interposed between N and its former children, so that none of the new nodes has more children than the established bound. (If the content tree is an HTML tree, the interposed nodes can be plain SPAN nodes, whose presence won't affect layout.) Similarly, when the number of words in a string exceeds the established bound for strings, it's divided into substrings, and a level of nodes is interposed between the string and its former parent in the content tree. If a single new level of nodes isn't sufficient to bring the maximum number of siblings, or the maximum string length in words, under the established bound, the operation of interposing a new level of nodes is repeated as required.

R-value is another example of a property that may be used in the formula in paragraph 108. Embodiments of the present invention assign an overall score for content node N as a match for search expression E according the following formula: $c_1*D+c_2*\Delta+c_3*\rho$, where D is the density of E on N, where $\Delta$ is the distribution score for E on N, where $\rho$ is the r-value for E on N, and where $c_1$, $c_2$, and $c_3$ are non-negative real numbers such that $c_1+c_2+c_3 \leq 1$. More generally, a formula of the form $(\Sigma_{1 \leq i \leq m}(c_i*P_i^{e_i}))*\Pi_{m+1 \leq i \leq n}P_i^{e_i}$ may be used to calculate overall score. The exponents $e_i$ are fixed on a per-property basis and need not be integers. The properties $P_1, \ldots, P_m$ may be considered "beneficial" properties, while properties $P_{m+1}, P_n$ may be considered "detrimental" properties. For example, suppose that content is being scored for delivery to a mobile device. Then download size might be an example of a detrimental property. The greater the download size, the lower the score, other things being equal. For each detrimental property $P_i$, either $P_i$ may be normalized so that its value is always greater than or equal to 1, in which case $e_i$ should be negative, or $P_i$ may be normalized so that its value is always greater than 0 and less than or equal to 1, in which case $e_i$ should be positive. Further, embodiments of the present invention partially or wholly specify content categories in terms of the values for the coefficients $c_1$ and the exponents $e_i$. For example, suppose that a minimum number of text characters for a given content category is stipulated, and that property P for a document constituent that is a putative instance of the given content category corresponds to the stipulated minimum number of text characters, minus the number of text characters within the document constituent. For a document constituent with less than the stipulated number of text characters, P may be considered a detrimental property in the evaluation of the document constituent as corresponding to the given content category, with a penalty corresponding to $P^e$, where $e > 0$ is stipulated for the given content category. Note that according to these embodiments, membership in a content category is a matter of degree.

For certain Web document constituents and other document constituents, high densities for search atoms do not accurately reflect relevance to search expressions constructed from the search atoms. For example, a Web page may include a constituent with many occurrences of the word "shirt," as in "cotton shirt linen shirt baby shirt toddler shirt summer shirt winter shirt . . . ," because the Web page was intentionally authored to correspond to searches for "cotton shirt," and so on. For another example, consider a Web page that contains links to new stories, with text extracts from these stories, where the Web page itself has been automatically constructed through a search for a small number of topically related search terms (as for bull market over a set of American electronic newspapers at a time when stock markets are rising sharply enough to constitute major news). This page of links and text extracts will be highly relevant to the topically related search terms, but perhaps not to the extent indicated by the densities of these terms on the page. To accommodate document constituents with spuriously high densities for search expressions, embodiments of the present invention stipulate bounds on densities. When the density of a search expression, and/or a sub-expression of the search expression, exceeds a stipulated bound, it is reset as the bound. Such bounds may be stipulated on a per-content-category basis. In some cases, spuriousness of high density may vary according to text length. For example, "cotton shirt" as the entirety of an image caption has a very high density for the search expression cotton shirt, but perhaps not spuriously so. Therefore embodiments of the present invention stipulate density bounds as functions of text lengths, where the functions behave asymptotically as text lengths increase. Some embodiments use functions of the form $c*b^{L^e}$, where $0 < c < 1$, $b > 1$, and $e < 0$ are stipulated, and where L is text length in words. In alternative embodiments, L is text length as a multiple of the aggregate number of words in the atoms of the search expression. Maximum density thus varies according to search expression. In some embodiments of the present invention, densities are normalized as a proportion of maximum density. In some alternative embodiments that use functions of the form $c*b^{L^e}$ as above, where L is text length as a multiple of the aggregate number of words in the atoms of a given search expression, c is defined the maximum density for the given search expression times a stipulated constant $0<\chi<1$ that's used for all search expressions, and b is $1/\chi$. In various embodiments, density bounds as above are applied in conjunction with various alternative methods of computing densities.

XIV. Optimization with Local Geometries

Hereafter, a "set of sibling content items" will be used as short-hand for "a set comprising all and only the children of some non-terminal node of a content tree." A set of sibling content items will be said to conform to a "local geometry" if each sibling can be assigned a position in a Euclidean space, or other geometric space for which barycenter is well-defined, so that the relevance distance between a pair of siblings corresponds to the distance between their positions, as distance is defined for the space. A content tree will be said to be "covered by local geometries" if every set of sibling content items within the tree conforms to some local geometry, with different sets of sibling content items possibly conforming to different local geometries.

The optimization of Paragraph 144 mitigates quadratic-time processing, but adds nodes to the content tree. The methods of Paragraphs 85-98 perform a single traversal of the content tree, while balancing calculations of r-values for $E_1$ ## ... ## $E_m$ according to pre-normalized r-values for $E_1, \ldots, E_m$ for sibling content items, against calculations of pre-normalized r-values for $E_1$ ## ... ## $E_m$ according to the densities of $E_1$ ## ... ## $E_m$ for sibling content items. However, the formulas of Paragraph 92 depend on using geometric mean to calculate pre-normalized r-values of $E_1$ ## ... ## $E_m$ from pre-normalized r-values of $E_1, \ldots, E_m$. Various alternative embodiments of the present disclosure do not add nodes to the content tree, while they ensure that the calculation of r-values for a set of sibling content items is linear in the number of siblings, on the condition that the set of sibling content items conforms to a local geometry. Moreover, these embodiments do not depend on using geometric mean to calculate pre-normalized r-values of $E_1$ ## ... ## $E_m$ from pre-normalized r-values of $E_1, \ldots, E_m$. They also allow the assignments of siblings' positions within geometric spaces to be independent of assignments of relevance sizes to siblings.

As an example of a set of sibling content items where each sibling can be associated with a position in a Euclidean space, consider a text where words appear in different fonts. For this example, the relevance size of each word depends on the word's font, with larger fonts corresponding to larger relevance sizes, and the position of each word corresponds to a point in one-dimensional Euclidean space, with the first word assigned position (0), the second word assigned position (1), and so on. Thus for this example, the relevance sizes assigned to words have no effect on the positions assigned to words. Relevance distance for this example is identified with Euclidean distance. Variants of this example exhibit warping ("warping" as discussed in Paragraph 79), so that the position assigned to a given word depends on the relevance sizes of the words that precede the given word in the string.

As a second example of a set of sibling content items where each sibling can be associated with a position in a Euclidean space, consider a database table with n rows, where for any pair of distinct rows, the relevance distance between the rows is the same. Thus the relevance distance between the first row and the second row is the same as the relevance distance between the first row and the last row, and so on. For this example, each row is assigned a position in (n-1)-dimensional Euclidean space, as a vertex of a regular n-simplex. Relevance distance for this example is identified with Euclidean distance.

Note that a single content tree may exhibit different local geometries for different sets of siblings. For example, a content tree may include a set of siblings corresponding to the rows of a table, as in the preceding paragraph, where each row includes a field corresponding to a text, as in the example in the paragraph that precedes the preceding paragraph. Embodiments of the present disclosure impose no requirement that the local geometry of the children of a content node N be related in any way to the local geometry of the children of any ancestor of N, or to the local geometry of children of any descendant of N. Thus the local geometry of the children of N may have a higher dimension than the local geometry of the set of siblings that includes N. For example, consider a Web slide show where each slide shows the five starting players of the Seattle SuperSonics basketball team during a playing season, and the slide show proceeds season by season, from earlier years to later years. The local geometry corresponding to each slide may be given as a regular 5-simplex, with each player corresponding to the vertex of the regular 5-simplex, while the local geometry of the slide show may be given as a 1-dimensional sequence.

Given a search expression E built from atomic search expressions with the ## operator, where the sub-expressions of E, in order according to a post-order traversal of the parse tree of E, are $E_1, \ldots, E_m$, and given a set of sibling content items $\{N_1, \ldots, N_k\}$ that conforms to a local geometry, where for $1 \leq i \leq k$, the relevance size of $N_i$ is $A_i$, the position of $N_i$ is $p_i$, and the density of $N_i$ for search expression $E_j$ is $D_{i,j}$ (in the case where E is an atomic search expression, the density of $N_i$ for E is $D_i$), embodiments of the present disclosure use two iterations over $N_1, \ldots, N_k$ to calculate relevance values for E for $N_1, \ldots, N_k$, as follows:

(a) Initialize variable $\mathbb{X}$ at 0. $\mathbb{X}$ will equal $\Sigma_{1 \leq i \leq k}(A_i)$ at the end of the first iteration. Initialize variable $\mathbb{Y}$ at 0. $\mathbb{Y}$ will equal $\Sigma_{1 \leq i \leq k}(A_i * p_i)$ at the end of the first iteration. Initialize variables $X_1, \ldots, X_m$ at 0. $X_j$ will equal $\Sigma_{1 \leq i \leq k}(A_i * D_{i,j})$ at the end of the first iteration. Initialize variables $Y_1, \ldots, Y_m$ at 0. $Y_j$ will equal $\Sigma_{1 \leq i \leq k}(A_i * D_{i,j} * p_i)$ at the end of the first iteration. (In the case where E is an atomic search expression, Initialize variables X at 0. X will equal $\Sigma_{1 \leq i \leq k}(A_i * D_i)$ at the end of the first iteration. Initialize variables Y at 0. Y will equal $\Sigma_{1 \leq i \leq k}(A_i * D_i * p_i)$ at the end of the first iteration.)

(b) Iterate over $N_1, \ldots N_k$, where for each sibling content item $N_i$, $\mathbb{X}$ is incremented by $A_i$, $\mathbb{Y}$ is incremented by $A_i * p_i$, and the following inner loop is executed:

(b-1) Iterate over $E_1, \ldots, E_m$, where for each sub-expression $E_j$, $X_j$ is incremented by $A_i * D_{i,j}$, and $Y_j$ is incremented by $A_i * D_{i,j} * p_i$. (In the case where E is an atomic search expression, X is incremented by $A_i * D_i$, and Y is incremented by $A_i * D_i * p_i$.)

(c) For each $1 \leq j \leq m$, posit a virtual sibling content item $V_j$ such that the position of $V_j$ is $Y_j / X_j$. Relevance size is undefined for virtual content items. Density with respect to search expressions is undefined for virtual content items. The influence capacity of $V_j$, corresponding to the product of relevance size with density for $E_j$, is $X_j$. (In the case where E is an atomic search expression, posit a virtual sibling content item V such that the position of V is Y/X and such that the influence capacity of V is X.) Also posit a virtual sibling content item $\mathbb{V}$ such that the position of $\mathbb{V}$ is $\mathbb{Y}/\mathbb{X}$ and such that the influence capacity of $\mathbb{V}$ is $\mathbb{X}$, corresponding to the maximum combined influence capacity of the sibling content items, $N_1, \ldots, N_k$.

(d) Iterate over $N_1, \ldots, N_k$, where for each sibling content item $N_i$, the following inner loop is executed:

(d-1) Iterate over $E_1, \ldots, E_m$. If $E_j$ is atomic, the pre-normalized relevance value for $N_i$ for $E_j$ is $X_j/(1+d_{i,j})^x$, where $d_{i,j}$ is the distance, according to the local geometry, between $N_i$ and $V_j$, and where x is the distance attenuation exponent. $E_1, \ldots, E_m$ are ordered according to post-order for the search expression parse tree, so if $E_j$ is non-atomic, this inner loop (d-1) has already applied to the children of $E_{j_1}, \ldots, E_{j_{hj}}$ of $E_j$, so the pre-normalized relevance values for $N_i$ for these children are known. The "search-expression-tree-synthesized input" to the pre-normalized relevance value for $N_i$ for $E_j$ is, according to various embodiments of the present disclosure, the arithmetic mean, or the geometric mean, or the harmonic mean, or some other function of the pre-normalized relevance values for $N_i$ for $E_{j_1}, \ldots, E_{j_{hj}}$. The "content-tree-synthesized" input to the pre-normalized relevance value for $N_i$ for $E_j$ is $X_j/(1+d_{i,j})^x$. (In the case where E is an atomic search expression, the "content-tree-synthesized" input to the pre-normalized relevance value for $N_i$ for E is $X/(1+d_i)^x$.) According to various embodiments, the pre-normalized relevance value for $N_i$ for $E_j$ is the sum of the search-expression-tree-synthesized input and the content-tree-synthesized input, or some other function applied to the search-expression-tree-synthesized input and the content-tree-synthesized input, such that the results of applying the function yields a value greater than or equal to the greater of the search-expression-tree-synthesized input and the content-tree-synthesized input. The relevance value for $N_i$ for $E_j$ is the pre-normalized relevance value for $N_i$ for $E_j$, divided by $X/(1+d_i)^x$, where $d_i$ is the distance between $N_i$ and $V$. (In the case where E is an atomic search expression, search-expression-tree-synthesized input is undefined, and the relevance value of $N_i$ for E is the content-tree-synthesized input of $N_i$ for E, divided by $X/(1+d_i)^x$.)

The first iteration over $N_1, \ldots, N_k$ may be called "outbound." For each sibling content item, the outbound iteration linearly captures the potential of the sibling content item to influence the other sibling content items (i.e., without nested iteration over the sibling content items). It posits a "virtual content item" for each of $E_1, \ldots, E_m$. These virtual content items encapsulate the total outbound influence over all the sibling content items. The second iteration over $N_1, \ldots, N_k$ may be called "inbound." For each sibling content item, the inbound iteration likewise linearly captures the influence received by the sibling content item from the other sibling content items (i.e., without nested iteration over the sibling content items).

XV. Computing Device Architecture

Figure 5:
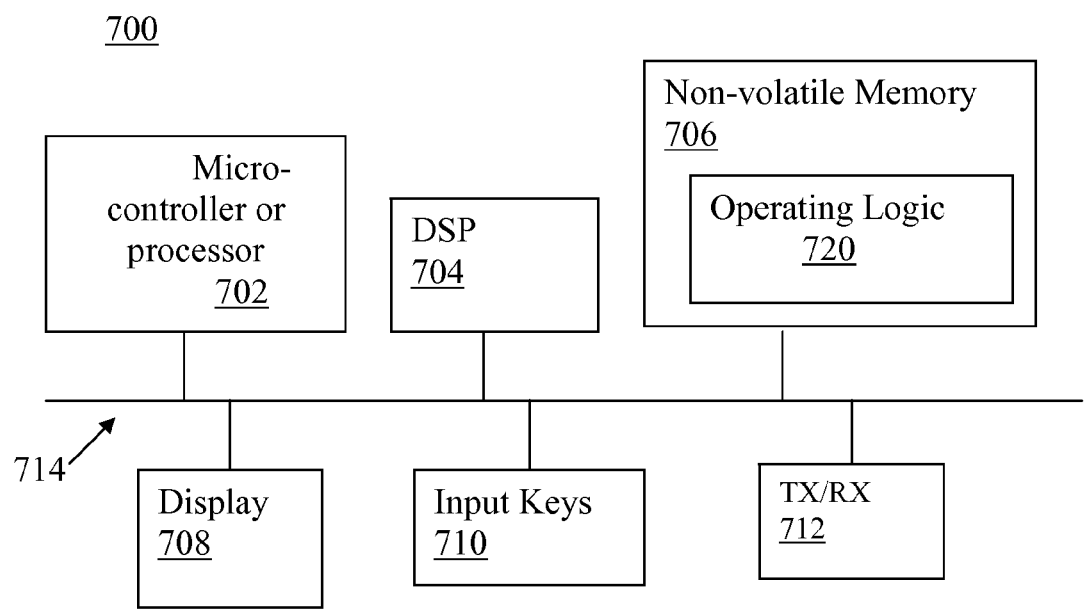
FIG. 5 illustrates an example computer system, suitable for use to facilitate practice of the present invention, in accordance with various embodiments.

FIG. 5 illustrates an architecture view of a computing device 700, such as a desktop computer or a PDA, suitable for practicing the present invention in accordance with one embodiment. Computing device 700 may be a server or a client. Whether as a server or client, computing device 700 may be coupled to clients or server via a wireless or wireline based interconnection, over one or more private and/or public networks, including the famous public network "Internet".

As illustrated, for the embodiment, computing device 700 includes elements found in conventional computing device, such as micro-controller/processor 702, digital signal processor (DSP) 704, non-volatile memory 706, display 708, input keys 710 (such as keypad, select button, D-unit), and transmit/receive (TX/RX) 712, coupled to each other via bus 714, which may be a single bus or an hierarchy of bridged buses. Further, non-volatile memory 706 includes operating logic 720 adapted to implement selected or all aspects of the earlier described content request engine 111, structured content search engine 114, content selection engine 116, and/or layout engine 117, in and of itself/themselves or as part of one or more larger components. In other words, the various engines may be implemented on one or more computing systems. For the latter implementations, the computing systems may be directly coupled, through Local and/or Wide Area Networks. The implementation(s) may be via any one of a number programming languages, assembly, C, and so forth.

In alternate embodiments, all or portions of the operating logic 720 may be implemented in hardware, firmware, or combination thereof. Hardware implementations may be in the form of application specific integrated circuit (ASIC), reconfigured reconfigurable circuits (such as Field Programming Field Array (FPGA)), and so forth.

Although specific embodiments have been illustrated and described herein, it will be appreciated by those of ordinary skill in the art that a wide variety of alternate and/or equivalent implementations may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A computer implemented method comprising:
   receiving by a search engine, operating on a computing device, from a content searching or consuming application, an atomic search term, the search engine and the content searching or consuming application being operated on one or more different or same computing devices;
   receiving content nominally associated with the atomic search term, or access information of the content, by the search engine;
   generating, by the search engine, one or more scores for one or more structures of the content indicative of relative relevance of the content or one or more portions of the content to the atomic search term, wherein the generating of a score for a structure is based at least in part on a distance function and a scoring function, wherein the structure has sub-structures structurally describing at least a portion of the content, and having content nodes and/or text strings, wherein the sub-structures are hierarchically organized with the one or more portions of the content in a sub-structure at a level respectively assigned one or more positions according to a geometry established for that level, wherein the distance function measures distances between sub-structures within the structure, and the scoring function is positionally sensitive, yielding different scores for different occurrence positions of the atomic search term in the sub-structures; and
   conditionally providing or not providing the content or one or more portions of the content, or access information of the content or one or more portions of the content, to the content searching or consuming application, by the search engine, based at least in part on the generated one or more scores;
   wherein the generating of a score for a structure further includes at each level, linearly iterating over one or more portions of the content at the level to capture potential of a portion to influence other portions of the level, and influence received by a portion from the other portions of the level.

2. The method of claim 1, wherein the atomic search term comprises a plurality of words.

3. The method of claim 1, wherein the structure comprises one or more strings of words, one or more markup strings, one or more trees corresponding to parsed markup, one or more deduced semantic trees, one or more database records or one or more database objects.

4. The method of claim 1, wherein the content comprises one or more web pages of one or more web applications, one or more XML documents in one or more XML repositories, one or more documents in one or more document corpora, or one or more database objects in one or more databases.

5. The method of claim 1, wherein the structure comprises a tree structure corresponding to parsed markup of the content, annotated with measurement information derived from layout structures associated with the content.

6. The method of claim 1, wherein for portions of the content in a substructure at a level $(N_1, \ldots, N_k)$, iterating over one or more portions of the content at the level to capture potential of a portion to influence other portions of the level comprises iterating over $N_1, \ldots, N_k$ to compute $\Sigma_{1 \leq i \leq k}(A_i)$, $\Sigma_{1 \leq i \leq k}(A_i*D_i)$, $\Sigma_{1 \leq i \leq k}(A_i*p_i)$, and $\Sigma_{1 \leq i \leq k}(A_i*D_i*p_i)$, wherein $A_i$ is relevance size of $N_i$, $D_i$ is the density of $N_i$ for the atomic search term, and $p_i$ is the position of $N_i$.

7. The method of claim 6, wherein the method further comprises calculating a virtual sibling content item V that corresponds to a combined capacity of $N_1, \ldots, N_k$ to influence relevance to the atomic search term, such that the position of V is $\Sigma_{1 \leq i \leq k}(A_i*D_i*p_i)/\Sigma_{1 \leq i \leq k}(A_i*D_i)$, and such that the influence capacity of V, corresponding to a product of relevance size with density for the atomic search term, is $\Sigma_{1 \leq i \leq k}(A_i*D_i)$.

8. The method of claim 6, wherein the method further comprises calculating a virtual sibling content item $\overline{V}$ that corresponds to a maximum combined capacity of $N_1, \ldots, N_k$ to influence relevance to any search term, such that the position of $\overline{V}$ is $\Sigma_{1 \leq i \leq k}(A_i*p_i)/\Sigma_{1 \leq i \leq k}(A_i)$, and such that the influence capacity of $\overline{V}$, corresponding to a product of relevance size with maximum density, is $\Sigma_{1 \leq i \leq k}(A_i)$.

9. The method of claim 1, wherein for portions of the content in a substructure at a level $(N_1, \ldots, N_k)$, iterating over one or more portions of the content at the level to capture influence received by a portion from the other portions of the level comprises iterating over $N_1, \ldots, N_k$, where for each sibling content item $N_i$, a pre-normalized relevance value for $N_i$ is $X/(1+d_i)^x$, where X is the influence capacity of a virtual content item corresponding to the atomic search expression, where $d_i$ is the distance, according to the geometry, between $N_i$ and the virtual content item corresponding to the atomic search expression, and where x is a distance attenuation exponent.

10. The method of claim 1, wherein a relevance value for $N_i$ is a pre-normalized relevance value for $N_i$, divided by $X/(1+d_i)^x$, where X is the influence capacity of a virtual content item corresponding to a maximum combined capacity of $N_1, \ldots, N_k$ to influence relevance to any search term, where $d_i$ is the distance, according to the geometry, between $N_i$ and the virtual content item corresponding to the maximum combined capacity of $N_1, \ldots, N_k$ to influence relevance to any search term, and where x is a distance attenuation exponent.

11. A computing apparatus, comprising:
one or more processors; and
means, operated by the one or more processors, for causing the apparatus to perform the computer implemented method of claim 1.

12. At least one non-transitory computer-readable storage medium comprising programming instructions configured, in response to execution of the programming instruction by a computing apparatus, to cause the computing apparatus to perform the computer implemented method of claim 1.

13. A computer implemented method comprising:
receiving by a search engine, operating on a computing device, from a content searching or consuming application, a search expression having a first and a second proximally associated atomic sub-expression, the search engine and the content searching or consuming application being operated on one or more different or same computing devices;
receiving content nominally associated with the search expression, or access information of the content, by the search engine;
generating, by the search engine, one or more scores for one or more structures of the content indicative of relative relevance of the content or one or more portions of the content to the search expression, wherein the generating of a score for a structure is based at least in part on a distance function and a scoring function, wherein the structure have sub-structures structurally describing at least a portion of the content, and having content nodes and/or text strings, wherein the sub-structures are hierarchically organized with the one or more portions of the content in a sub-structure at a level respectively assigned one or more positions according to a geometry established for that level, wherein the distance function measures distances between sub-structures within the structure, and the scoring function is positionally sensitive, yielding different scores for different occurrence positions of either or both of the proximally associated first and second atomic sub-expressions in the sub-structures; and
conditionally providing or not providing the content or one or more portions of the content, or access information of the content or one or more portions of the content, to the content searching or consuming application, by the search engine, based at least in part on the generated one or more scores;
wherein the generating of a score for a structure further includes at each level, linearly iterating over one or more portions of the content at the level to capture potential of a portion to influence other portions of the level, and influence received by a portion from the other portions of the level.

14. The method of claim 13, wherein either or both of the first and second atomic sub-expressions comprises a plurality of words.

15. The method of claim 13, wherein the first and second atomic sub-expressions are proximally associated explicitly by a proximity operator.

16. The method of claim 13, wherein the content comprises one or more web pages of one or more web applications, one or more XML documents in one or more XML repositories, one or more documents in one or more document corpora, or one or more database objects in one or more databases.

17. The method of claim 13, wherein the structure comprises one or more strings of words, markup strings, trees corresponding to parsed markup, database records or database objects.

18. The method of claim 13, wherein the structure comprises a tree corresponding to parsed markup of the content, annotated with measurement information derived from layout structures associated with the content.

19. The method of claim 13, wherein the search expression comprises sub-expressions $E_1, \ldots, E_m$, and wherein for portions of the content in a substructure at a level $(N_1, \ldots, N_k)$, iterating over one or more portions of the content at the level to capture potential of a portion to influence other portions of the level comprises iterating over $N_1, \ldots, N_k$ to compute $\Sigma_{1 \le i \le k}(A_i)$ and $\Sigma_{1 \le i \le k}(A_i * p_i)$, and iterating over $E_1, \ldots, E_m$ for each $N_i$ to compute, for each $1 \le i \le k$ and $1 \le j \le m$, $\Sigma_{1 \le i \le k}(A_i * D_i)$, and $\Sigma_{1 \le i \le k}(A_i * D_{i,j} * p_i)$, wherein $A_i$ is relevance size of $N_i$, $D_{i,j}$ is the density of $N_i$ for search expression $E_j$, and $p_i$ is the position of $N_i$.

20. The method of claim 19, wherein the method further comprises calculating, for each search expression $E_j$, a virtual sibling content item $V_j$ that corresponds to a combined capacity of $N_1, \ldots, N_k$ to influence relevance to $E_j$, such that the position of $V_j$ is $\Sigma_{1 \le i \le k}(A_i * D_{i,j} * p_i) / \Sigma_{1 \le i \le k}(A_{i,j} * D_i)$, and such that the influence capacity of $V_j$, corresponding to a product of relevance size with density for $E_j$, is $\Sigma_{1 \le i \le k}(A_i * D_{i,j})$.

21. The method of claim 19, wherein the method further comprises calculating a virtual sibling content item $\cancel{V}$ that corresponds to a maximum combined capacity of $N_1, \ldots, N_k$ to influence relevance to any search term, such that the position of $\cancel{V}$ is $\Sigma_{1 \le i \le k}(A_i * p_i) / \Sigma_{1 \le i \le k}(A_i)$, and such that the influence capacity of $\cancel{V}$, corresponding to a product of relevance size with maximum density, is $\Sigma_{1 \le i \le k}(A_i)$.

22. The method of claim 13, wherein the search expression comprises sub-expressions $E_1, \ldots, E_m$, and wherein for portions of the content in a substructure at a level corresponds to content items at the level ($N_1, \ldots, N_k$), iterating over one or more portions of the content at the level to capture influences received by a portion from the other portions of the level comprises iterating over $N_1, \ldots, N_k$, where for each sibling content item $N_i$ and for each search expression $E_j$, content-tree-synthesized input to a pre-normalized relevance value for $N_i$ for $E_j$ is $X_j / (1 + d_{i,j})^x$, where $X_j$ is the influence capacity of a virtual content item corresponding to $E_j$, where $d_{i,j}$ is the distance, according to the geometry, between $N_i$ and the virtual content item corresponding to $E_j$, and where x is a distance attenuation exponent.

23. The method of claim 22, wherein $E_1, \ldots, E_m$ are ordered according to post-order for a parse tree of the search expression, wherein if $E_j$ is non-atomic, search-expression-tree-synthesized input to the pre-normalized relevance value for $N_i$ for $E_j$ is based at least in part on pre-normalized relevance values for $N_i$ for $E_{j_1}, \ldots, E_{j_{hj}}$, where $E_{j_1}, \ldots, E_{j_{hj}}$ are children of $E_j$ in the parse tree.

24. The method of claim 23, wherein the search-expression-tree-synthesized input to the pre-normalized relevance value for $N_i$ for $E_j$ is an arithmetic mean, a geometric mean, or a harmonic mean of the pre-normalized relevance values for $N_i$ for $E_{j_1}, \ldots, E_{j_{hj}}$.

25. The method of claim 13 wherein a pre-normalized relevance value for $N_i$ for $E_j$ is based at least in part on content-tree-synthesized input to a pre-normalized relevance value for $N_i$ for $E_j$ and search-expression-tree-synthesized input to a pre-normalized relevance value for $N_i$ for $E_j$.

26. The method of claim 25, wherein a pre-normalized relevance value for $N_i$ for $E_j$ is a sum of a content-tree-synthesized input to a pre-normalized relevance value for $N_i$ for $E_j$, and a search-expression-tree-synthesized input to a pre-normalized relevance value for $N_i$ for $E_j$.

27. The method of claim 13, wherein a relevance value for $N_i$ for a search sub-expression $E_j$ is a pre-normalized relevance value for $N_i$ for $E_j$, divided by $X/(1+d_{i,j})^x$, where X is the influence capacity of a virtual content item corresponding to a maximum combined capacity of $N_1, \ldots, N_k$ to influence relevance to any search term, where $d_{i,j}$ is the distance, according to the geometry, between $N_i$ and the virtual content item corresponding to the maximum combined capacity of $N_1, \ldots, N_k$ to influence relevance to any search term, and where x is a distance attenuation exponent.

28. The method of claim 13, wherein the search expression further comprises a third atomic sub-expression proximally associated with the proximally associated first and second atomic sub-expressions, and the generating being associatively sensitive yielding different scores for different associations of the proximally associated first, second and third atomic sub-expressions.

29. The method of claim 13, wherein the search expression comprises a plurality of recursively embedded sub-expressions, including a sub-expression having the first and second proximally associated atomic sub-expressions.

30. A computing apparatus, comprising:
one or more processors; and
means, operated by the one or more processors, for causing the apparatus to perform the computer implemented method of claim 13.

* * * * *